United States Patent
Suzuki et al.

(10) Patent No.: US 7,532,044 B2
(45) Date of Patent: *May 12, 2009

(54) PHOTODETECTOR

(75) Inventors: Takashi Suzuki, Hamamatsu (JP); Itsushi Tadamasa, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/632,117

(22) PCT Filed: Jul. 11, 2005

(86) PCT No.: PCT/JP2005/012794

§ 371 (c)(1),
(2), (4) Date: Jan. 2, 2008

(87) PCT Pub. No.: WO2006/006575

PCT Pub. Date: Jan. 19, 2006

(65) Prior Publication Data

US 2008/0204085 A1 Aug. 28, 2008

(30) Foreign Application Priority Data

Jul. 12, 2004 (JP) ............................ 2004-205053

(51) Int. Cl.
*H03C 3/00* (2006.01)
*H03K 17/78* (2006.01)

(52) U.S. Cl. ...................................... 327/101; 327/514

(58) Field of Classification Search ......... 327/514–515, 327/100–101; 340/438, 461

See application file for complete search history.

(56) References Cited

U.S. PATENT DOCUMENTS

| 6,370,408 | B1 * | 4/2002 | Merchant et al. ............. 600/322 |
| 6,456,141 | B1 * | 9/2002 | Nishizono et al. ............ 327/345 |
| 7,259,858 | B2 * | 8/2007 | Tanamachi ................... 356/445 |
| 7,262,560 | B2 * | 8/2007 | Jaffar et al. .................. 315/291 |
| 7,408,451 | B2 * | 8/2008 | Blank et al. .................. 340/438 |

FOREIGN PATENT DOCUMENTS

| JP | 49-24459 | 6/1972 |
| JP | 49-24459 A | 3/1974 |
| JP | 56-154673 | 11/1981 |
| JP | 56-154673 A | 11/1981 |
| JP | 64-15973 | 1/1989 |

(Continued)

*Primary Examiner*—Dinh T. Le
(74) *Attorney, Agent, or Firm*—Drinker Biddle & Reath LLP

(57) ABSTRACT

An I/F converter 10 contained in a photodetector is provided with a first comparing portion $11_1$, a second comparing portion $11_2$, a current mirror circuit 14, an SR type flip-flop circuit 16, a buffer amplifier 18, a first capacitor $C_1$, a second capacitor $C_2$, a switch $SW_1$, a switch $SW_2$, a switch $SW_{11}$ and a switch $SW_{21}$. The operation characteristics of the first comparing portion $11_1$ and the second comparing portion $11_2$ are identical to each other. The capacitance values of the two capacitors $C_1$ and $C_2$ are equal to each other. The input terminal 10a of the I/F converter 10 is connected to a photodiode, and the I/F converter 10 inputs current generated by the photodiode through the input terminal 10a thereof and outputs a signal having the frequency corresponding to the magnitude of the input current from a buffer amplifier 18.

12 Claims, 14 Drawing Sheets

FOREIGN PATENT DOCUMENTS

| | | |
|---|---|---|
| JP | 2-64421 | 3/1990 |
| JP | 5-66154 | 3/1993 |
| JP | 10-30960 | 2/1998 |
| JP | 2002-107428 | 4/2002 |
| JP | 2003-505687 | 2/2003 |
| JP | 2004-325409 | 11/2004 |

\* cited by examiner

Fig.10
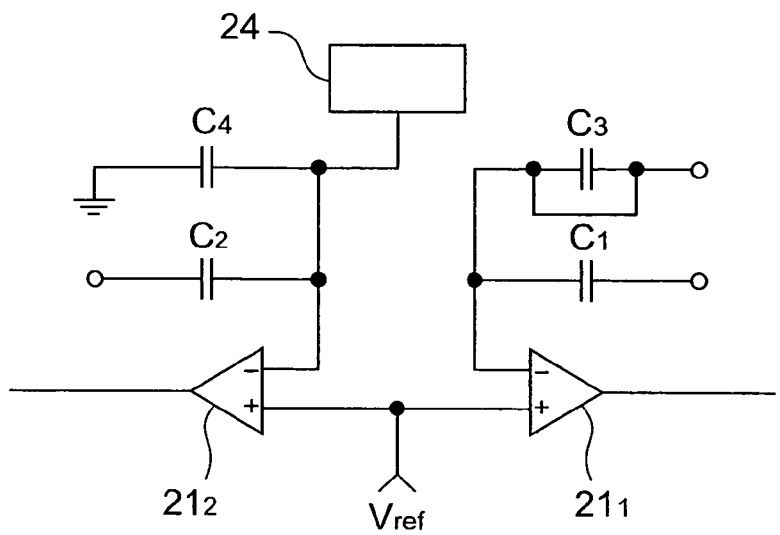
(a)
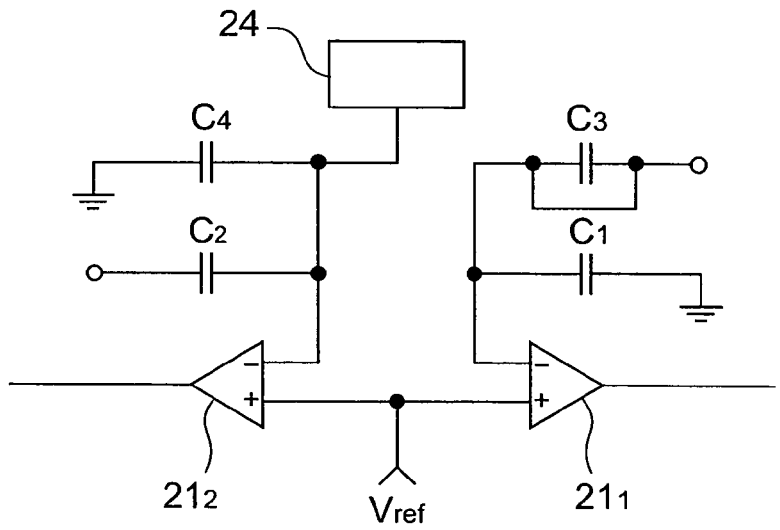
(b)
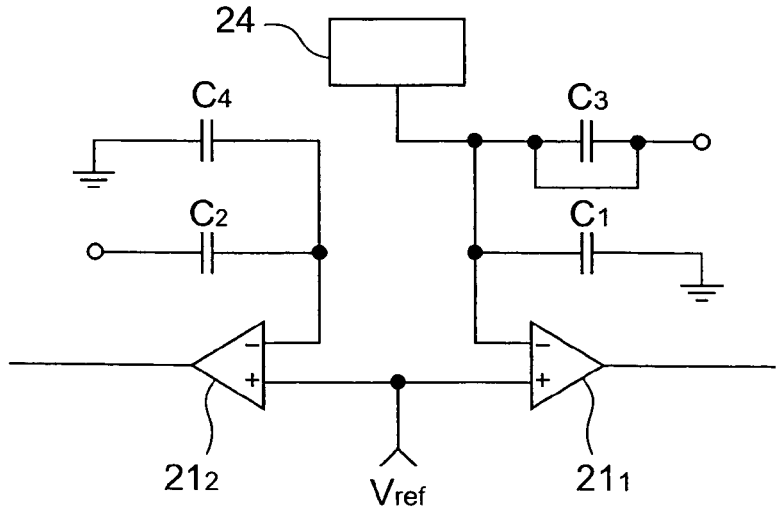
(c)

Fig.11
(a)
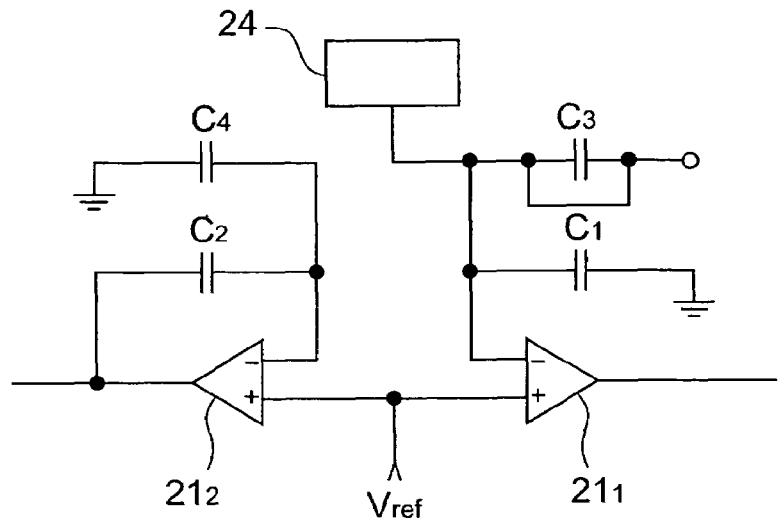
(b)
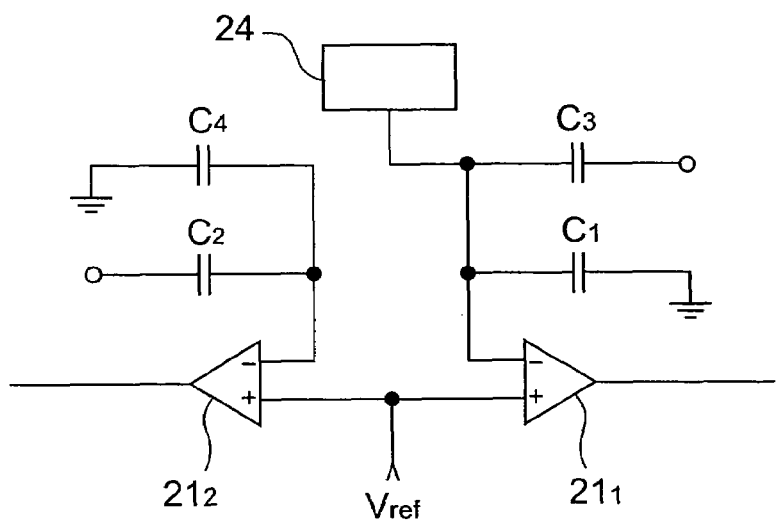
(c)
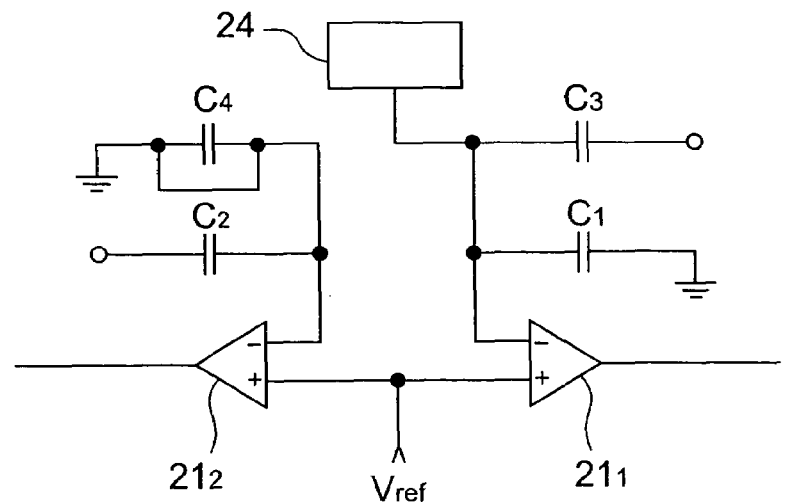

Fig.12
(a)
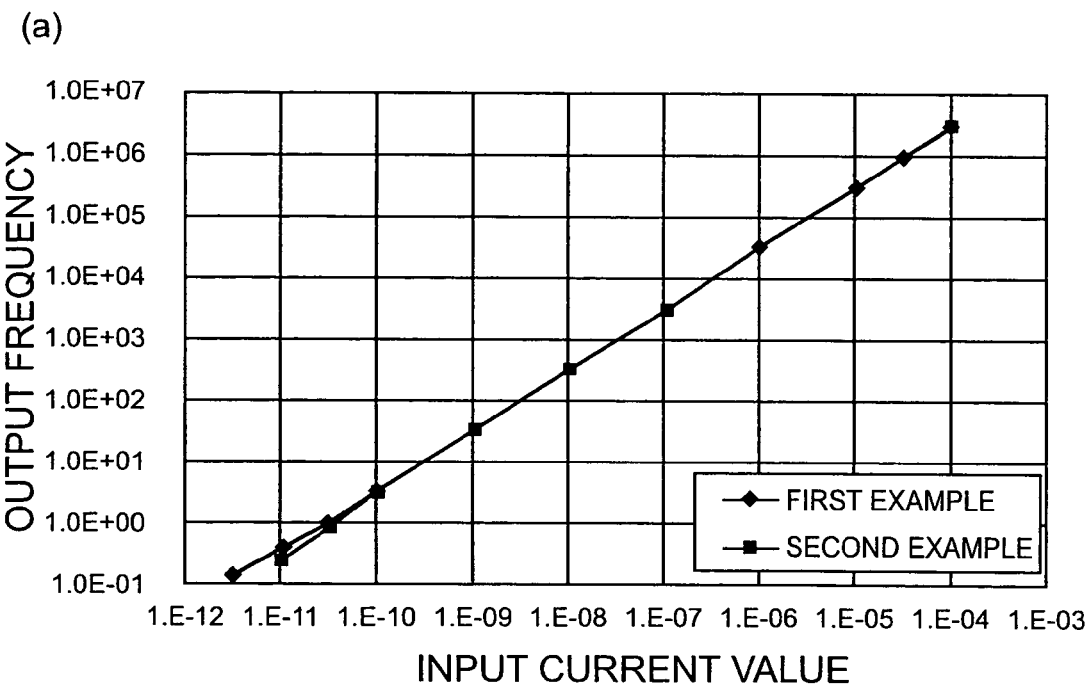
(b)
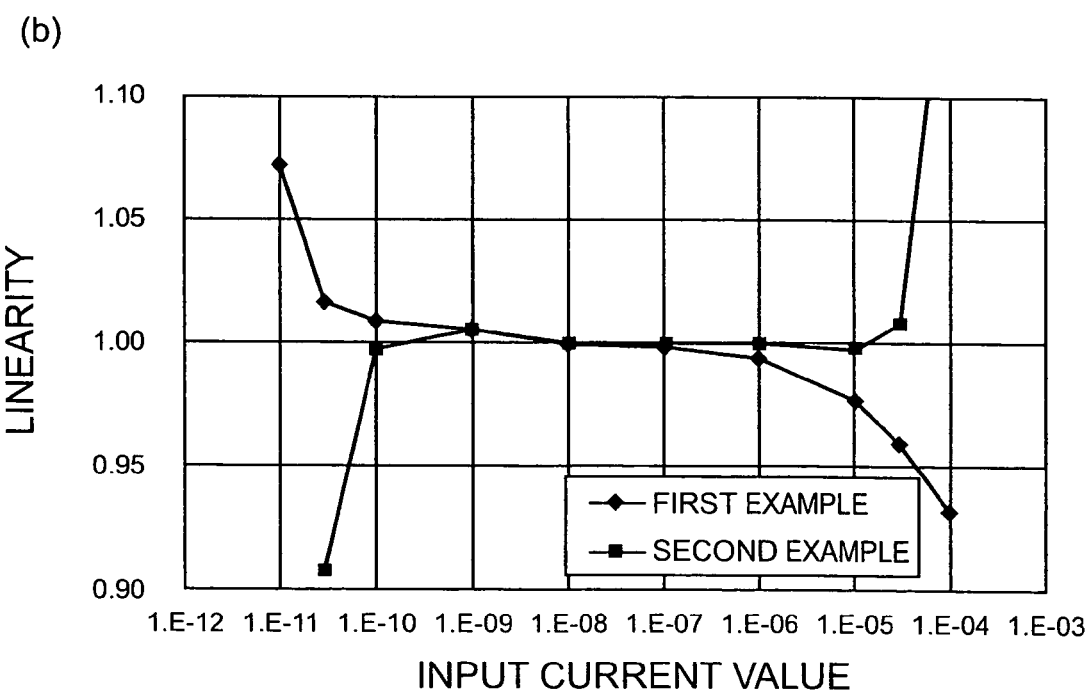

PHOTODETECTOR

TECHNICAL FIELD

The present invention relates to a photodetector having a plurality of photodetecting elements and an I/F converter.

BACKGROUND ART

A photodetecting element (for example, a photodiode, a photomultiplier or the like) can output current whose magnitude corresponds to the intensity of incident light, and can detect the light intensity on the basis of the current value. Such a photodetecting element is excellent in linearity between the incident light intensity and the output current value in a broad dynamic range with respect to incident light intensity. On the other hand, it is known that the dynamic range of sensitivity of the human eye with respect to light intensity is on the order of about six digits.

Therefore, an A/D converter for inputting a current value output from a photodetecting element and subjecting the current value to A/D conversion is required to output a digital value having a large number of bits in connection with the broad dynamic range of the light intensity as described above. For example, the digital value output from the A/D converter is 20 bits although the dynamic range of light intensity is on the order of six digits. However, it is difficult to implement an A/D converter for outputting a digital value of 20 bits as described above.

In order to solve the problem as described above, an I/F converter for outputting a signal whose frequency corresponds to the magnitude of input current has been proposed (for example, see Patent Document 1). The I/F converter is supplied with a current value output from a photodetecting element, and outputs a pulse signal whose frequency corresponds to the magnitude of the current value (that is, incident light intensity to the photodetecting element). Accordingly, by counting the number of pulses per unit time in the signal output from the I/F converter, the light intensity can be achieved as a digital value in a broad dynamic range.

Furthermore, according to the photodetector having the plurality of photodetecting elements and the I/F converter, the photodetecting elements are respectively disposed at a plurality of points, whereby the light intensity detected by the photodetecting element disposed at each point can be achieved as a digital value in a broad dynamic range. Furthermore, for example, wavelength selecting filters having different transmission characteristics are disposed in front of the respective photodetecting elements, whereby the intensities of light beams having different wavelengths can be achieved as digital values in a broad dynamic range.

FIG. 14 is a diagram showing the construction of a conventional I/F converter disclosed in Patent Document 1. The I/F converter 40 disclosed in FIG. 14 is equipped with a current-voltage converting circuit 41, a transistor $Tr_1$, current mirror circuits 42 and 43, a mirror integrating circuit 44, a comparing circuit 45 and a reference voltage source 46.

The current-voltage converting circuit 41 has an operational amplifier 41a and a feedback resistance element Rf, and inputs a current value output from the current value detecting circuit 4, converts the current value to the corresponding voltage and outputs the voltage concerned. The transistor $Tr_1$ is supplied with the voltage output from the current-voltage converting circuit 41 at the gate terminal thereof, amplifies the input voltage logarithmically and then makes the current corresponding to the amplified voltage flow between the source terminal and the drain terminal. The current mirror circuit 42 has transistors $Tr_2$ and $Tr_3$, and it amplifies and outputs the current output from the transistor $Tr_1$. The current mirror circuit 43 has transistors $Tr_4$ and $Tr_5$, and it amplifies and outputs the current output from the current mirror circuit 42.

The mirror integrating circuit 44 has an operational amplifier 44a and a feedback capacitor C, and inputs current output from the current mirror circuit 43, accumulates charges in the capacitor C in accordance with the input current and outputs the voltage corresponding to the amount of the accumulated charges. The comparing circuit 45 compares the magnitude of the voltage output from the mirror integrating circuit 44 with a reference voltage $V_{ref}$ output from a reference voltage source 46, and outputs a comparison signal representing the compared result. A switch 34 provided between the input and output terminals of the operational amplifier 44a of the mirror integrating circuit 44 inputs the comparison signal which is output from the comparing circuit 45 and passed through a buffer amplifier 33, and it is opened and closed on the basis of the comparison signal.

In the I/F converter 40, the accumulated amount of charges in the capacitor C gradually increases as current is input to the mirror integrating circuit 44, and the voltage output from the mirror integrating circuit 44 increases. Finally, when the voltage output from the mirror integrating circuit 44 exceeds the reference voltage $V_{ref}$ the comparison signal output from the comparing circuit 45 is inverted, whereby the switch 34 is closed and the capacitor C is discharged. When the capacitor C is discharged, the comparison signal is inverted again, the switch 34 is opened, and the accumulation of charges in the capacitor C is resumed. As described above, the capacitor C is repetitively charged and discharged, and the comparison signal output from the comparing circuit 45 is a signal representing the repetition of charging and discharging and having the frequency corresponding to the magnitude of the input current value.

The I/F converter 40 has a transistor $Tr_1$ having a logarithmic amplification characteristic, and thus it can enhance the linearity of the input/output relationship between the input current value and the output frequency even when the output frequency (input current value) is so high (large) that the discharge period of the capacitor C cannot be sufficiently secured when a transistor having no logarithmic amplification characteristic is used. That is, the I/F converter 40 is used to enhance the linearity of the input/output relationship with respect to the input current value in a broad dynamic range.

Patent Document 1: Japanese Published Unexamined Patent Application No. 2002-107428

However, as described later with reference to FIG. 4, it is difficult for the photodetector having the above-described conventional I/F converter to implement the high-precision conversion in a broad dynamic range for high linearity for the input/output relationship between the incident light intensity and the output frequency. In particular, when the photodetecting device has a plurality of photodetecting elements, it is important to implement higher linearity with high precision between the incident light intensity to each photodetecting element and the output frequency from the I/F converter.

The present invention has been implemented to solve the foregoing problem, and has an object to provide a photodetecting device that can implement high linearity for the input/output relationship in a broad dynamic range with high precision.

DISCLOSURE OF THE INVENTION

A photodetector according to the present invention is characterized by including (a) a plurality of photodetecting elements for outputting current whose magnitude corresponds to the intensity of incident light, and (b) an I/F converter for inputting current output from each of the plurality of photodetecting elements and generating a signal having the frequency corresponding to the magnitude of the current. Furthermore, the I/F converter includes: (1) switching means for selectively switching the input current to any one of a first output terminal and a second output terminal and outputting the input current, (2) a first capacitor that is connected to the first output terminal of the switching means and accumulates charges in accordance with the input of current, (3) first discharging means for discharging charges accumulated in the first capacitor, (4) a first comparing portion that is connected to one end of the first capacitor at the input terminal thereof, comparing the magnitude of the voltage at the one end of the first capacitor with a reference voltage and outputting a first comparison signal representing the compared result from the output terminal thereof, (5) a second capacitor that is connected to the second output terminal of the switching means and accumulates charges corresponding to the input of current, (6) second discharging means for discharging charges accumulated in the second capacitor, and (7) a second comparing portion that is connected to one end of the second capacitor at the input terminal thereof, compares the magnitude of the voltage at one end of the second capacitor with a reference voltage, and outputs a second comparison signal representing the compared result from the output terminal thereof.

In the photodetecting device, current which is output in accordance with the incident light intensity from each of the plurality of photodetecting elements is input to the I/F converter, and the signal having the frequency corresponding to the magnitude of the current is output from the I/F converter.

In the I/F converter, when the switching means is set so that current is output from the first output terminal, the input current passes through the switching means and flows into the first capacitor, so that charges are accumulated in the first capacitor. As the amount of charges accumulated in the first capacitor increases, the voltage input to the input terminal of the first comparing portion gradually increases. Finally, the voltage is larger than the reference voltage, and the first comparison signal output from the output terminal of the first comparing portion is level-inverted. In connection with the level-inversion of the first comparison signal, the charges accumulated in the first capacitor are discharged from the first discharging means, and the first comparison signal output from the output terminal of the first comparing portion is level-inverted.

Thereafter, the setting is altered in the switching means so that current is output to the second output terminal, and the input current passes through the switching means and flows into the second capacitor, so that charges are accumulated into the second capacitor. As the amount of charges accumulated in the second capacitor increases, the voltage input to the input terminal of the second comparing portion gradually increases. Finally, the voltage is larger than the reference voltage, and the second comparison signal output from the output terminal of the second comparing portion is level-inverted. Then, in connection with the level-inversion of the second comparison signal, the charges accumulated in the second capacitor are discharged from the second discharging means, and the second comparison signal output from the output terminal of the second comparing portion is level-inverted.

The above operation is repeated, and the signal output from the first comparing portion or the second comparing portion of the I/F converter becomes pulse signals, and the frequency of the pulse signals corresponds to the magnitude of the input current (that is, the intensity of incident light to each photodetecting element).

In order to perform the above-described operation, it is preferable that timing control means is further equipped and the timing control means controls the operations of the switching means, the first discharging means and the second discharging means on the basis of the first comparison signal and the second comparison signal.

In the photodetector according to the present invention, it is preferable that one I/F converter is provided to the plurality of photodetecting elements, and the I/F converter successively inputs the current output from each of the photodetecting elements for a predetermined period, and successively generates a signal whose frequency corresponds to the magnitude of the current. Furthermore, it is preferable to provide a counter for counting the number of pulses of the signal generated by the I/F converter. Still furthermore, it is also preferable that the counter outputs a counted result as a parallel signal, and a P/S converter for converting the parallel signal output from the counter to a serial signal and outputs the serial signal.

In this case, the current output from each of the plurality of photodetecting elements is successively input to the I/F converter for a predetermined period, and the signal having the frequency corresponding to the magnitude of each current is output from the I/F converter. When the counter is provided, the number of pulses in the signal generated by the I/F converter is counted by the counter. Furthermore, when the P/S converter is further provided, the parallel signal output from the counter is converted to the serial signal by the P/S converter.

In the photodetector according to the present invention, it is preferable that a plurality of I/F converters are provided in one-to-one correspondence to the plurality of photodetecting elements, and each of the plurality of I/F converters generates current output from the corresponding photodetecting element and outputs a signal whose frequency corresponds to the magnitude of the current. Furthermore, it is also preferable that a plurality of counters are provided in one-to-one correspondence to the plurality of I/F converters, and each counter counts the number of pulses in the signal generated by the corresponding I/F converter. Furthermore, it is also preferable that the plurality of counters output counted results as parallel signals, and there is provided only one P/S converter that is provided to the plurality of counters, successively inputs the parallel signals output from the plurality of counters, converts the parallel signals to serial signals and outputs the serial signals. Furthermore, it is preferable that each of the plurality of counters counts the number of pulses in the signal generated by the corresponding I/F converter over the same period.

In this case, one photodetecting element, one I/F converter and one counter are set as one set, and the photodetecting device is equipped with a plurality of sets. Current output from each photodetecting element is input to the I/F converter corresponding to the photodetecting element, and the signal having the frequency corresponding to the magnitude of the current is output from the I/F converter. When the counters are provided, the number of pulses in the signal generated by each I/F converter is counted by the counter corresponding to the I/F converter concerned. Furthermore, when the P/S converters are provided, the parallel signal output from each of the counters is converted to the serial signal by the P/S converter corresponding to the counter. When each of the plurality of counters counts the pulse number for the same period, the intensity of incident light to each of the plurality of photodetecting elements is detected at the same timing.

The I/F converter contained in the photodetector according to the present invention is preferably equipped with (1) a third capacitor that is connected to the first output terminal of the switching means and connected to the input terminal of the first comparing portion at one end thereof and accumulates charges in accordance with the input of current, (2) third discharging means for discharging the charges accumulated in the third capacitor, (3) a fourth capacitor that is connected to the second output terminal of the switching means and connected to the input terminal of the second comparing portion at one end thereof and accumulates charges in accordance with the input of current, (4) fourth discharge means for discharging charges accumulated in the fourth capacitor, (5) first connecting means for selectively setting any one of a state where the other end of the first capacitor is connected to the ground potential, a state where the other end of the first capacitor is connected to the output terminal of the first comparing portion and a state where the other end of the first capacitor is opened, (6) second connecting means for selectively setting any one of a state where the other end of the second capacitor is connected to the ground potential, a state where the other end of the second capacitor is connected to the output terminal of the second comparing portion and a state where the other end of the second capacitor is opened, (7) third connecting means for selectively setting any one of a state where the other end of the third capacitor is connected to the ground potential, a state where the other end of the third capacitor is connected to the output terminal of the first comparing portion and a state where the other end of the third capacitor is opened, and (8) fourth connecting means for selectively setting any one of a state where the other end of the fourth capacitor is connected to the ground potential, a state where the other end of the fourth capacitor is connected to the output terminal of the second comparing portion and a state where the other end of the fourth capacitor is opened. Furthermore, it is preferable that each of the first comparing portion and the second comparing portion can be selectively set to any one of a comparator mode and an amplifier mode.

The comparator mode is an operating mode in which the magnitude of the voltage input to the input terminal is compared with a reference voltage, and a comparison signal representing the compared result is output from the output terminal. The amplifier mode is an operating mode in which when a feedback capacitor is connected between the input terminal and the output terminal, the voltage corresponding to the charges accumulated in the feedback capacitor is output from the output terminal.

By further providing the third capacitor and the fourth capacitor, the discharging means for discharging the charges of each capacitor and the connecting means for setting the connection state of each capacitor in addition to the first capacitor and the second capacitor, the charges are successively and repeatedly accumulated in the first capacitor, the second capacitor, the third capacitor and the fourth capacitor in this order, the signal output from the first comparing portion or the second comparing portion becomes a pulse signal, and the frequency of the pulse signal corresponds to the magnitude of the current input to the input terminal.

In order to perform the operation as described above, it is preferable that timing control means is further provided, and the operations of the switching means, the first discharging means, the second discharging means, the third discharging means, the fourth discharging means, the first connecting means, the second connecting means, the third connecting means, the fourth connecting means, the first comparing portion and the second comparing portion are controlled on the basis of the first comparison signal and the second comparison signal by the timing control means.

According to the present invention, high linearity of the input/output relationship can be implemented in a broad dynamic range with high precision.

BRIEF DESCRIPTION OF THE DRAWINGS

FIG. 10 is a diagram showing the open/close state of each switch and the connection state of each capacitor at each time in the operation of the I/F converter 20 of the second example;

FIG. 11 is a diagram showing the open/close state of each switch and the connection state of each capacitor at each time in the operation of the I/F converter 20 of the second example;

FIG. 12 is a diagram showing the comparison between the operation of the I/F converter 10 of the first example and the operation characteristics of the I/F converter 20 of the second example;

Figure 1:
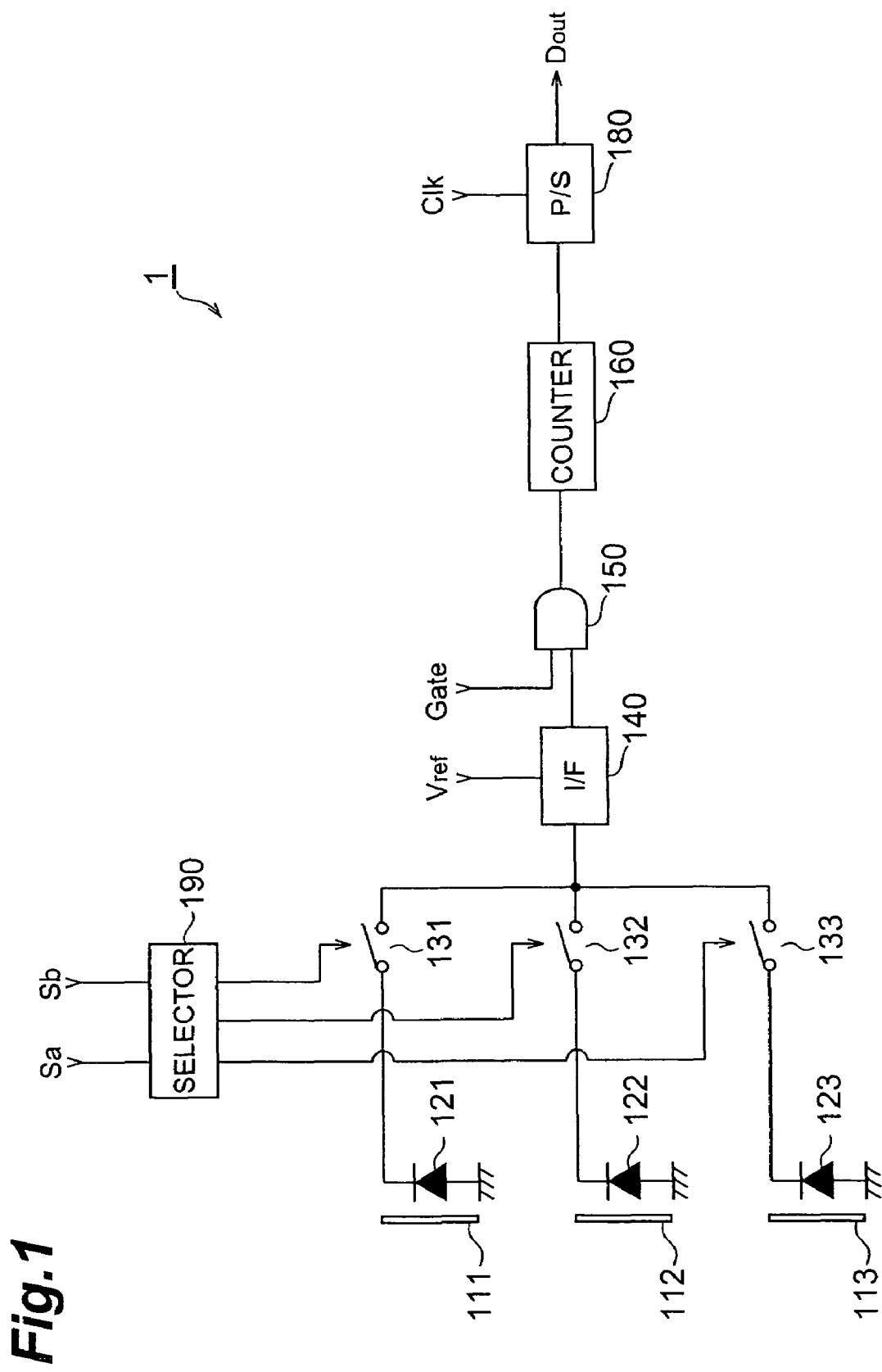
FIG. 1 is a diagram showing the construction of a photodetector 1 according to a first embodiment.

DESCRIPTION OF SYMBOLS 1, 2 photodetector
10 I/F converter
$11_1$ first comparing portion
$11_2$ second comparing portion
14 current mirror circuit
16 SR type flip-flop circuit
17 timing controller
18 buffer amplifier
20 I/F converter
$21_1$ first comparing portion
$21_2$ second comparing portion
$22_1$ first overvoltage preventing circuit 22₂ second overvoltage preventing circuit
23₁ first one-shot circuit
23₂ second one-shot circuit
24 current mirror circuit
26 SR type flip-flop circuit
27 timing controller
28 buffer amplifier
111 to 113 optical filter
121 to 123 photodiode
131 to 133 gate portion
140 to 143 I/F converter
150 to 153 gate portion
160 to 163 counter
171 to 173 gate portion
180 P/S converter
190 selector

BEST MODES FOR CARRYING OUT THE INVENTION

Preferred embodiments for carrying out the present invention will be described in detail with reference to the accompanying drawings. In the description of the drawings, the same elements are represented by the same reference numerals, and overlapping description thereof is omitted. In the following description, the number of photodiodes as photodetecting elements is equal to three, however, the number of photodiodes may be equal to 2 or four or more.

FIRST EMBODIMENT

First, a first embodiment of a photodetector according to the present invention will be described. FIG. 1 is a diagram showing the construction of a photodetector 1 according to the first embodiment. The photodetector 1 shown in FIG. 1 is equipped with optical filters 111, 112, and 113, photodiodes 121, 122, and 123, gate portions 131, 132, and 133, an I/F converter 140, a gate portion 150, a counter 160, a P/S converter 180 and a selector 190.

The optical filters 111 to 113 are wavelength selecting filters having different transmission characteristics. For example, the optical filter 111 selectively transmits light of a red wavelength area $\lambda_{RED}$ therethrough, the optical filter 112 selectively transmits light of a green wavelength area $\lambda_{GREEN}$ therethrough, and the optical filter 113 selectively transmits light of a blue wavelength area $\lambda_{BLUE}$ therethrough. The photodiode 121 receives light transmitted through the optical filter 111, and outputs the current corresponding to the intensity of the received light. The photodiode 122 receives light transmitted through the optical filter 112, and outputs the current corresponding to the intensity of the received light. The photodiode 123 receives the light transmitted through the optical filter 113, and outputs the current corresponding to the intensity of the received light.

Each of the gate portions 131 to 133 is operated on the basis of a control signal output from a selector 190. The gate 131 selects input/cutoff of current output from the photodiode 121 to the I/F converter 140. The gate 132 selects input/cutoff of current output from the photodiode 122 to the I/F converter 140. Furthermore, the gate 133 selects input/cutoff of current output from the photodiode 123 to the I/F converter 140.

The input terminal of the I/F converter 140 is connected to the photodiode diodes 121 to 123 via the gate portions 131 to 133, and current output from the photodiodes 121 to 123 is successively input by operating the gate portions 131 to 133. The I/F converter 140 generates and outputs a pulse signal whose frequency corresponds to the magnitude of input current. The ratio of the output frequency to the input current value in the I/F converter 140 is adjusted by the reference voltage $V_{ref}$.

The gate portion (AND circuit) 150 inputs the pulse signal output from the I/F converter 140, and also inputs the gate signal Gate. The gate portion 150 outputs a logical signal of low level when the gate signal Gate is in low level, and also outputs the input pulse signal to the counter 160 when the gate signal Gate is in high level.

The counter 160 counts the number of pulses of the pulse signal which is output from the I/F converter 140 and passed through the gate portion 150, and outputs the counted value as a parallel signal. The P/S converter 180 inputs the parallel signal output from the counter 160, converts the parallel signal to a serial signal and then outputs the serial signal Dout in synchronizing with a clock signal Clk.

The selector 190 inputs logical signals Sa and Sb, and generates and outputs a control signal for controlling the operations of the gate portions 131 to 133 on the basis of the logical signals Sa and Sb. For example, when both the logical signals Sa and Sb are in low level, the selector 190 inputs the current output from the photodiode 121 via the gate portion 131 to the I/F converter 140. When the logical signal Sa is in high level and the logical signal Sb is in low level, the selector 190 inputs the current output from the photodiode 122 through the gate portion 132 to the I/F converter 140. When both the logical signals Sa and Sb are in high level, the selector 190 inputs the current output from the photodiode 123 via the gate portion 133 to the I/F converter 140.

In the photodetecting device 1 according to the first embodiment, red light out of the input light is transmitted through the optical filter 111 and received by the photodiode 121, and the current corresponding to the intensity of the red light is output from the photodiode 121. Green light is transmitted through the optical filter 112 and received by the photodiode 122, and the current corresponding to the intensity of the green light is output from the photodiode 122. Furthermore, blue light is transmitted through the optical filter 113 and received by the photodiode 123, and the current corresponding to the intensity of the blue light is output from the photodiode 123.

The current output from each of the photodiode 121 to 123 is successively input to the input terminal of the I/F converter 140 by the operation of the gate portions 131 to 133 controlled by the selector 190. In the I/F converter 140, the pulse signal having the frequency corresponding to the magnitude of the current input to the input terminal is generated, and the concerned pulse signal is output.

The pulse signal output from the I/F converter 140 is input to the counter 160 by the operation of the gate portion 150 during the time period when the gate signal Gate is in high level, and the pulses are counted by the counter 160. This counted value of the pulses is output as a parallel signal from the counter 160. The parallel signal output from the counter 160 is converted to a serial signal by the P/S converter 180, and the serial signal Dout is output from the P/S converter 180. Accordingly, the digital value corresponding to the intensity of the red light received by the photodiode 121, the digital value corresponding to the intensity of the green light received by the photodiode 122 and the digital value corresponding to the intensity of the blue light received by the photodiode 123 are successively output as the serial signal.

Figure 2:
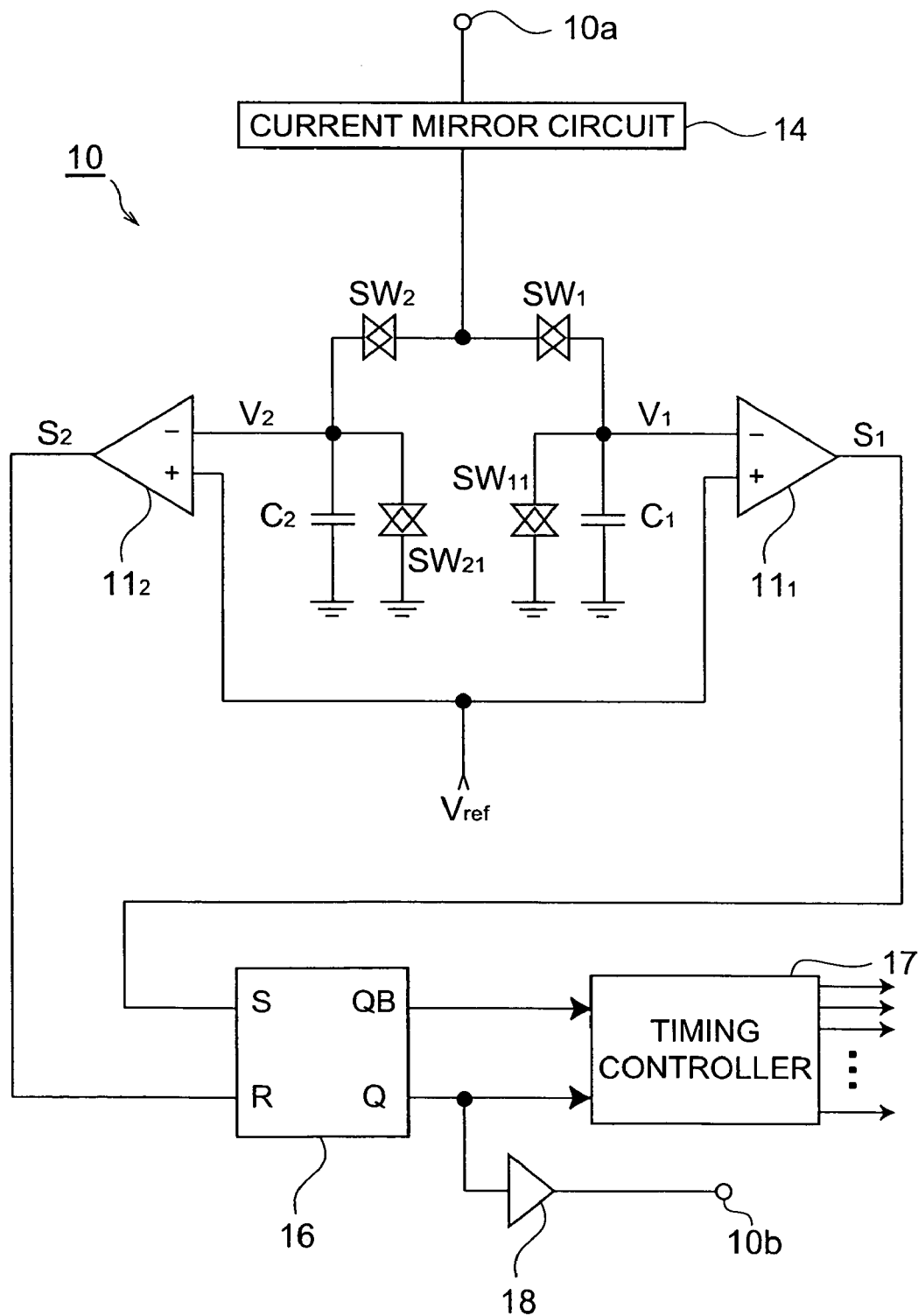
FIG. 2 is a diagram showing the construction of an I/F converter 10 according to the first example.

Next, the specific construction of the I/F converter 140 contained in the photodetector 1 according to this embodiment will be described. FIG. 2 is a diagram showing the construction of the I/F converter 10 according to the first example. The I/F converter 10 shown in FIG. 2 is preferably used as the I/F converter 140 shown in FIG. 1, and includes a first comparing portion $11_1$, a second comparing portion $11_2$, an SR type flip-flop circuit 16, a timing controller 17, a buffer amplifier 18, a first capacitor $C_1$, a second capacitor $C_2$, a switch $SW_1$, a switch $SW_2$, a switch $SW_{11}$ an a switch $SW_{21}$.

The operation characteristics of the first comparing portion $11_1$ and the second comparing portion $11_2$ are identical to each other. The capacitance values of the two capacitors $C_1$ and $C_2$ are equal to each other. The I/F converter 10 is connected to the photodiodes 121 to 123 via the gate portions 131 to 133, successively inputs the current generated by the photodiodes 121 to 123 through the input terminal 10a and outputs the signal having the frequency corresponding to the magnitude of the input current from the output terminal 10b.

The switch $SW_1$ is provided between the input terminal 10a and the inverting input terminal of the first comparing portion $11_1$. The switch $SW_2$ is provided between the input terminal 10a and the inverting input terminal of the second comparing portion $11_2$. The switch $SW_1$ and the switch $SW_2$ serve as switching means for selectively switching and outputting the current input to the input terminal 10a to any one of the first output terminal (the connection point with the inverting input terminal of the first comparing portion $11_1$) and the second output terminal (the connection point with the inverting input terminal of the second comparing portion $11_2$). A current mirror circuit 14 is preferably provided just after the input terminal 10a. In this case, the current mirror circuit 14 amplifies the current input to the input terminal 10a and outputs it to the switch $SW_1$ and the switch $SW_2$.

One end of the first capacitor $C_1$ is connected to the input terminal 10a via the current mirror circuit 14 and the switch $SW_1$, and also connected to the inverting input terminal of the first comparing portion $11_1$. The other end of the first capacitor $C_1$ is grounded. The first capacitor $C_1$ can accumulate the charges corresponding to the input of the current. The switch $SW_{11}$ is provided between one end of the first capacitor $C_1$ and the ground potential, and acts as first discharging means for discharging charges accumulated in the first capacitor $C_1$.

The first comparing portion $11_1$ inputs the voltage $V_1$ of one end of the first capacitor $C_1$ through the inverting input terminal thereof, inputs the reference voltage $V_{ref}$ input from the outside through the non-inverting input terminal thereof to compare the magnitude of the voltage $V_1$ with the reference voltage $V_{ref}$, and outputs a first comparison signal $S_1$ representing the compared result from the output terminal. The first comparison signal $S_1$ is in high level when the voltage $V_1$ is smaller than the reference voltage $V_{ref}$, and it is in low level when the voltage $V_1$ is larger than the reference voltage $V_{ref}$.

One end of the second capacitor $C_2$ is connected to the input terminal 10a via the current mirror circuit 14 and the switch $SW_2$, and also connected to the inverting input terminal of the second comparing portion $11_2$. The other end of the second capacitor $C_2$ is grounded. The second capacitor $C_2$ can accumulate charges in accordance with the input of the current. The switch $SW_{21}$ is provided between one end of the second capacitor $C_2$ and the ground potential, and acts as second discharging means for discharging the charges accumulated in the second capacitor $C_2$.

The second comparing portion $11_2$ inputs the voltage $V_2$ of one end of the second capacitor $C_2$ through the inverting input terminal thereof, inputs the reference voltage $V_{ref}$ input from the outside through the non-inverting input terminal thereof to compare the magnitude of the voltage $V_2$ with the reference voltage $V_{ref}$, and outputs a second comparison signal $S_2$ representing the compared result to the output terminal. The second comparison signal $S_2$ is in high level when the voltage $V_2$ is smaller than the reference voltage $V_{ref}$ and in low level when the voltage $V_2$ is larger than the reference voltage $V_{ref}$.

The SR type flip-flop circuit 16 inputs the first comparison signal $S_1$ output from the first comparing portion $11_1$ through the S input terminal thereof, inputs the second comparison signal $S_2$ output from the second comparing portion $11_2$ to the R input terminal thereof, and outputs the output signals varying in accordance with the level variations of the first comparison signal $S_1$ and the second comparison signal $S_2$ from the Q output terminal and the QB output terminal thereof. The buffer amplifier 18 amplifies the signal output from the Q output terminal of the SR type flip-flop circuit 16, and outputs it from the output terminal 10b to the outside. The output terminal 10b is connected to the gate portion 150.

The SR type flip-flop circuit 16 and the timing controller 17 also act as timing control means for controlling the operation of each switch on the basis of the first comparison signal $S_1$ and the second comparison signal $S_2$. That is, each of the switch $SW_1$ and the switch $SW_{21}$ is closed when the value of the signal output from the QB output terminal of the SR type flip-flop circuit 16 is in high level, and also opened when it is in low level. Furthermore, each of the switch $SW_2$ and the switch $SW_{11}$ is closed when the value of the signal output from the Q output terminal of the SR type flip-flop circuit 16 is in high level, and opened when it is in low level.

Figure 3:
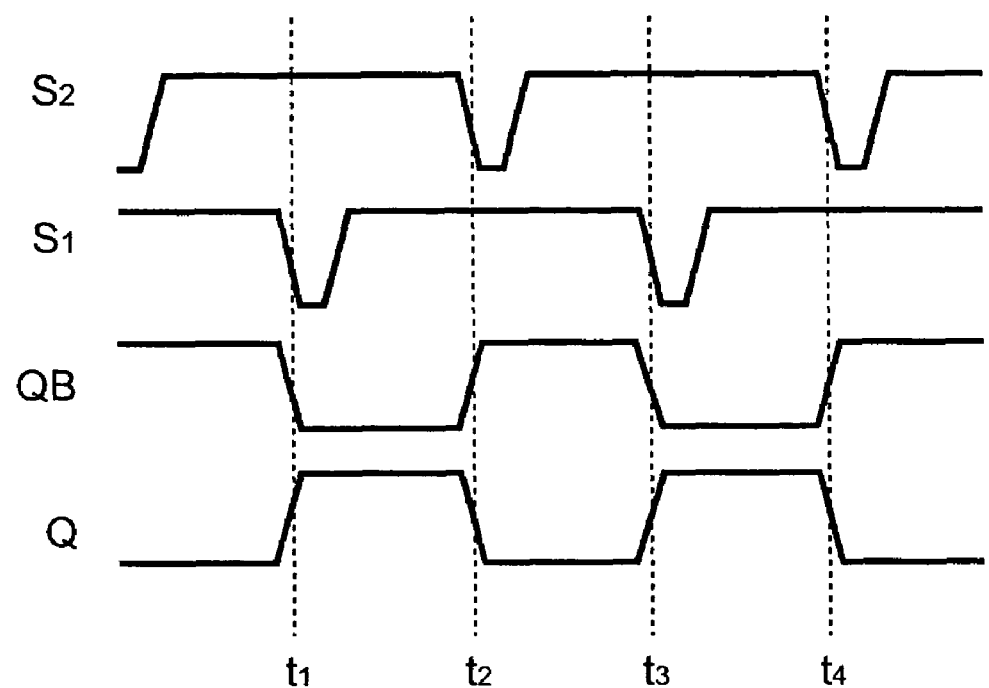
FIG. 3 is a timing chart showing the operation of the I/F converter 10 of the first example.

Next, the operation of the I/F converter 10 of the first example will be described. FIG. 3 is a timing chart showing the operation of the I/F converter 10 according to the first example. The current output from any of the photodiodes 121 to 123 to which light is made incident is input to the input terminal 10a of the I/F converter 10, and also input through the current mirror circuit 14 to the switches $SW_1$ and $SW_2$.

Before the time $t_1$, the Q output of the SR type flip-flop circuit 16 is in low level, and the QB output is in high level, so that each of the switch $SW_1$ and the switch $SW_{21}$ is closed and each of the switch $SW_2$ and the $SW_{11}$ is opened. The current input to the input terminal 10a passes through the current mirror circuit 14 and the switch $SW_1$ and then flows into the first capacitor $C_1$, so that charges are accumulated in the first capacitor $C_1$. The voltage $V_1$ input to the inverting input terminal of the first comparing portion $11_1$ gradually increases with an increase in the amount of the charges accumulated in the first capacitor $C_1$, and finally the voltage $V_1$ is larger than the reference voltage $V_{ref}$ input to the non-inverting input terminal at the time $t_1$. The first comparison signal $S_1$ output from the output terminal of the first comparing portion $11_1$ is shifted from high level to low level at the time $t_1$.

In connection with the shift from the first comparison signal $S_1$ to the low level at the time $t_1$, the Q output of the SR type flip-flop circuit 16 is shifted to the high level, and the QB output is shifted to the low level, so that each of the switch $SW_1$ and the switch $SW_{21}$ is opened, and each of the switch $SW_2$ and the switch $SW_{11}$ is closed. Through the opening/closing operation of each switch as described above, the charges accumulated in the first capacitor $C_1$ are discharged, and the first comparison signal $S_1$ output from the output terminal of the first comparing portion $11_1$ is returned to high level.

Subsequently to the time $t_1$, the current input to the input terminal 10a passes through the current mirror circuit 14 and the switch $SW_2$ and flows into the second capacitor $C_2$, so that charges are accumulated in the second capacitor $C_2$. The voltage $V_2$ input to the inverting input terminal of the second comparing portion $11_2$ gradually increases with an increase in the amount of charges accumulated in the second capacitor $C_2$, and it is finally larger than the reference voltage $V_{ref}$ input to the non-inverting input terminal at the time $t_2$. The second comparison signal $S_2$ output from the output terminal of the second comparing portion $11_2$ is shifted from high level to low level at the time $t_2$.

In connection with the shift of the second comparison signal $S_2$ at the time $t_2$, the Q output of the SR type flip-flop circuit 16 is shifted to low level, and the QB output is shifted to high level, so that each of the switch $SW_1$ and the switch $SW_{21}$ is closed and each of the switch $SW_2$ and the switch $SW_{11}$ is opened. Through the opening/closing operation of each switch, the charges accumulated in the second capacitor $C_2$ are discharged, and the second comparison signal $S_2$ output from the output terminal of the second comparing portion $11_2$ is returned to high level.

The operation as described above is repeated, and the Q output signal of the SR type flip-flop circuit 16 becomes a pulse signal. The Q output signal is passed through the buffer amplifier 18 and then output from the output terminal 10b. Then, the number of pulses of the signal output from the output terminal 10b is counted by the counter 160, and the counted value thereof (that is, the frequency) is output as a digital value. The frequency thus achieved increases as the increasing speed of the amount of charges accumulated in each of the first capacitor $C_1$ and the second capacitor $C_2$ is higher, that is, the current input to the input terminal 10a is larger.

Figure 4:
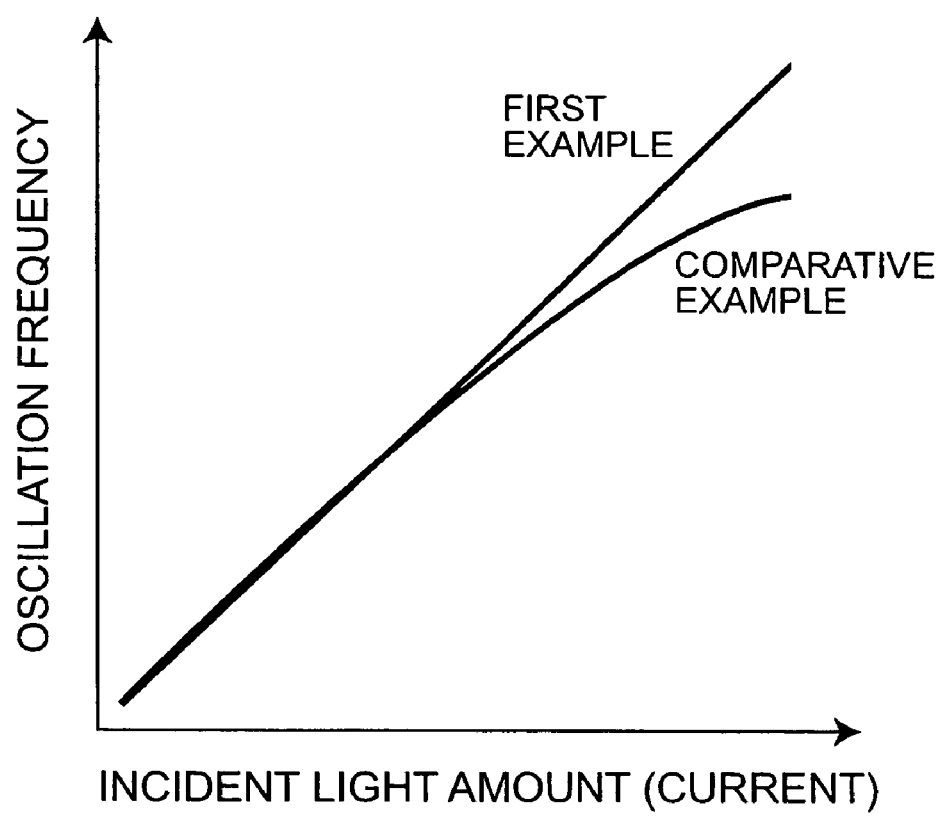
FIG. 4 is a graph showing the operation characteristics of the photodetector 1 containing the I/F converter 10 of the first example.
Figure 14:
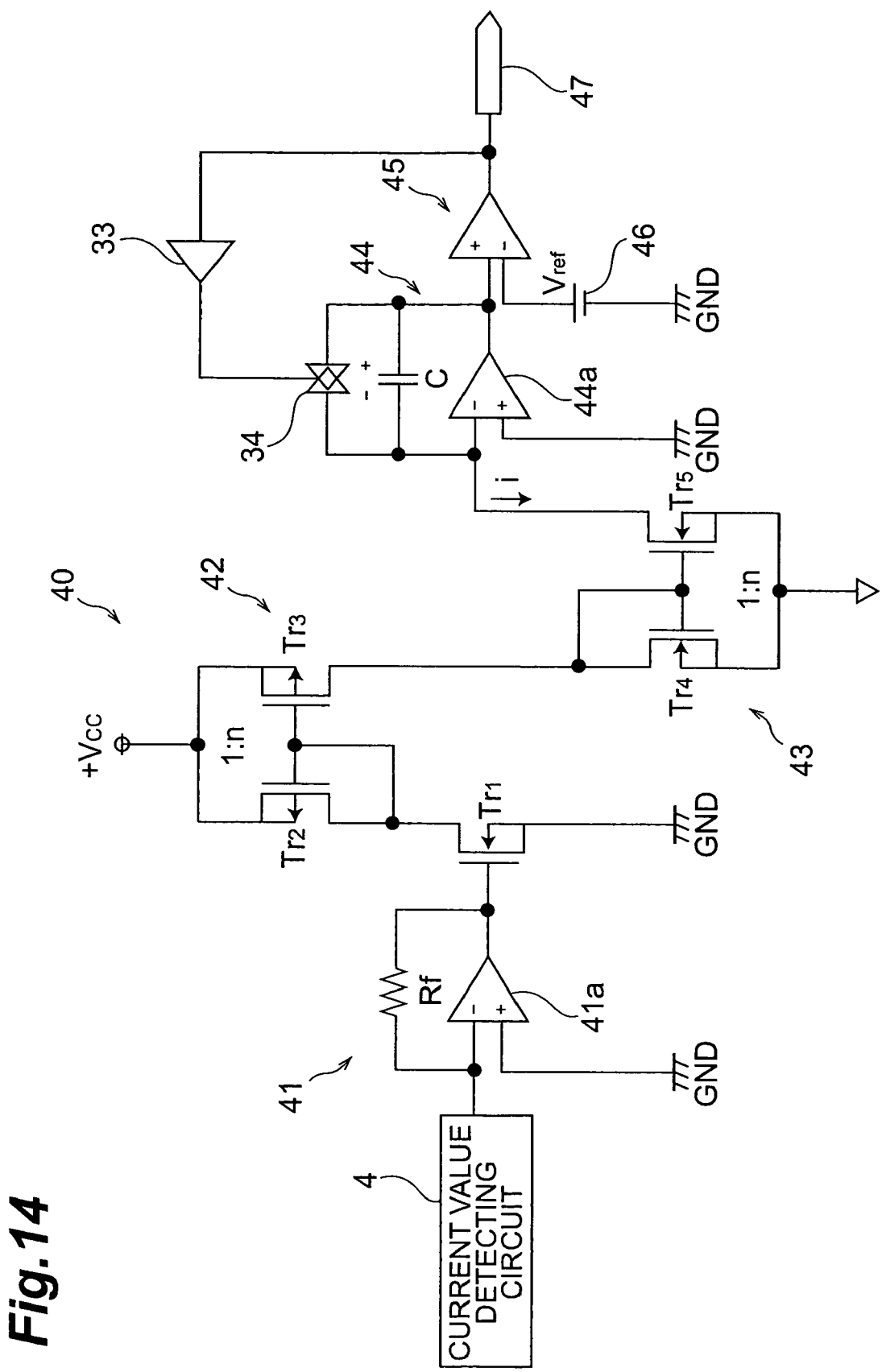
FIG. 14 is a diagram showing the construction of a conventional I/F converter.

FIG. 4 is a graph showing the operation characteristics of the photodetector 1 containing the I/F converter 10 of the first example. In this graph, the abscissa axis represents the intensity of incident light to each photodiode of the photodetector 1 or the current value input to the input terminal 10a of the I/F converter 10. The ordinate axis represents the frequency measured by the counter 160. In this figure, the operation characteristics of the I/F converter having the construction shown in FIG. 14 are shown as a comparative example in comparison with the first example. As shown in FIG. 4, in the comparative example, the linearity of the input/output relationship is deteriorated in the area where the incident light amount to the photodiode is large (the area where the current value is large). On the other hand, in this embodiment, the linearity of the input/output relationship is excellent even in the area where the incident light amount to the photodiode is large (the area where the current value is large). As described, according to the I/F converter 10 and the photodetector 1 of this embodiment, even when one capacitor $C_1$ is discharged, the other capacitor $C_2$ is charged, and thus the high linearity of the input/output relationship can be implemented with high precision in a broad dynamic range.

Figure 5:
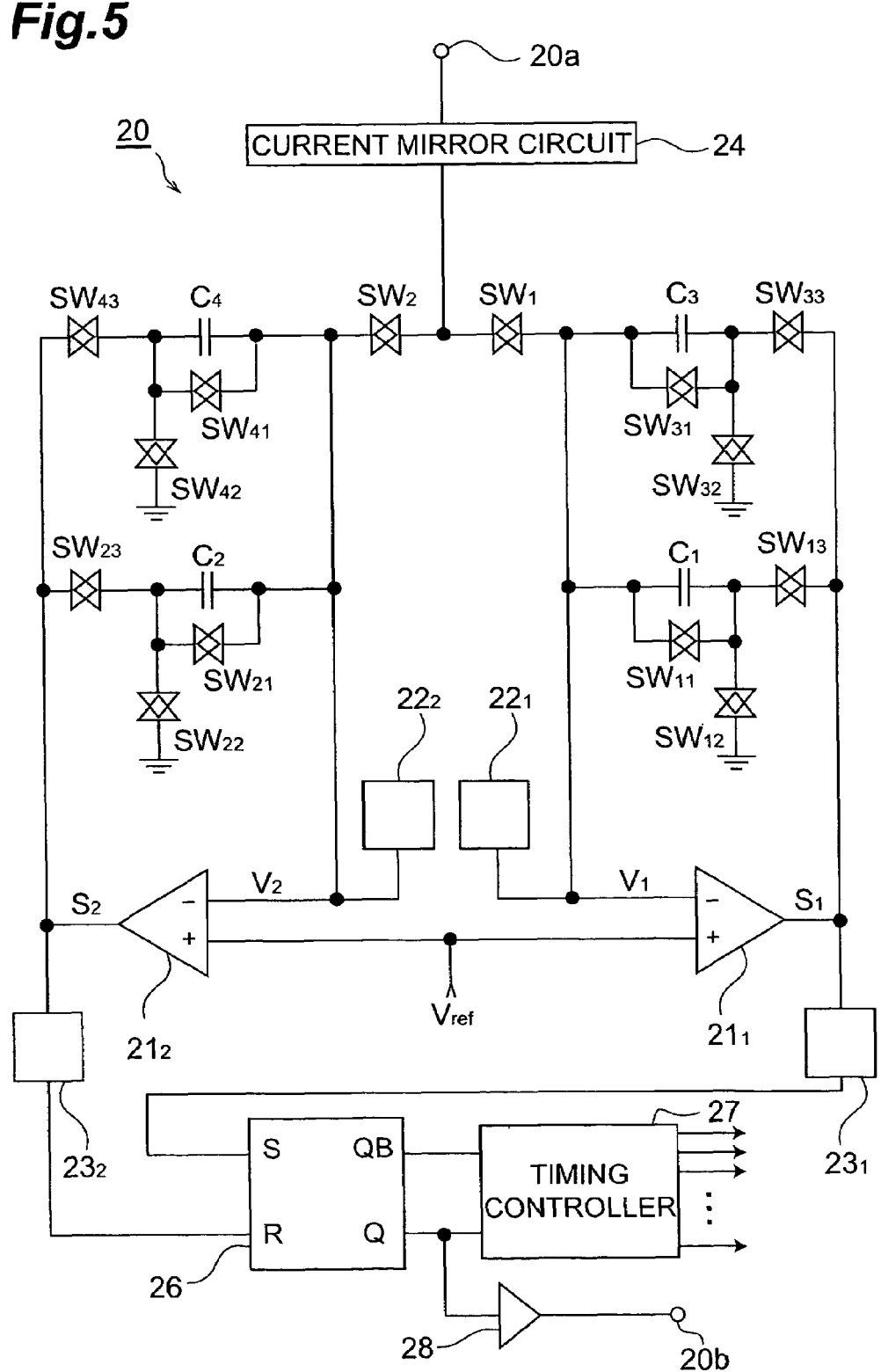
FIG. 5 is a diagram showing the construction of the I/F converter 20 according to a second example.

Next, another specific construction of the I/F converter 140 contained in the photodetector 1 according to this embodiment will be described. FIG. 5 is a diagram showing the construction of the I/F converter 20 according to a second example. The I/F converter 20 shown in FIG. 5 is preferably used as the I/F converter 140 of FIG. 1, and it includes a first comparing portion $21_1$, a second comparing portion $21_2$, a first overvoltage preventing circuit $22_1$, a second overvoltage preventing circuit $22_2$, a first one-shot circuit $23_1$, a second one-shot circuit $23_2$, an SR type flip-flop circuit 26, a timing controller 27, a buffer amplifier 28, a first capacitor $C_4$, a second capacitor $C_2$, a third capacitor $C_3$, a fourth capacitor $C_4$, a switch $SW_1$, a switch $SW_2$, switches $SW_{11}$ to $SW_{13}$, switches $SW_{21}$ to $SW_{23}$, switches $SW_{31}$ to $SW_{33}$, and switches $SW_{41}$ to $SW_{43}$.

The operation characteristics of the first comparing portion $21_1$ and the second comparing portion $21_2$ are identical to each other. The capacitance values of the four capacitors $C_1$ to $C_4$ are equal to one another. In the I/F converter 20, the input terminal 20a is connected to the photodiodes 121 to 123 via the gate portions 131 to 133. The I/F converter 20 inputs the current generated by the photodiodes 121 to 123 through the input terminal 20a, and outputs the signal having the frequency corresponding to the magnitude of the input current from the output terminal 20b.

The switch $SW_1$ is provided between the input terminal 20a and the inverting input terminal of the first comparing portion $21_1$. The switch $SW_2$ is provided between the input terminal 20a and the inverting input terminal of the second comparing portion $21_2$. The switch $SW_1$ and the switch $SW_2$ acts as switching means for selectively switching and outputting the current input to the input terminal 20a to any one of the first output terminal (the connection point to the inverting input terminal of the first comparing portion $21_1$) and the second output terminal (the connection point to the inverting input terminal of the second comparing portion $21_2$). It is preferable that a current mirror circuit 24 is provided just after the input terminal 20a. In this case, the current mirror circuit 24 amplifies the current input to the input terminal 20a and outputs it to the switch $SW_1$ and the switch $SW_2$.

One end of each of the first capacitor $C_1$ and the third capacitor $C_3$ is connected to the input terminal 20a via the current mirror circuit 24 and the switch $SW_1$, and also connected to the inverting input terminal of the first comparing portion $21_1$. Each of the first capacitor $C_1$ and the third capacitor $C_3$ can accumulate charges in accordance with the input of current.

The switch $SW_{11}$ is provided between one end and the other end of the first capacitor $C_1$, and acts as first discharging means for discharging charges accumulated in the first capacitor $C_1$. The switch $SW_{12}$ is provided between the other end of the first capacitor $C_1$ and the ground potential. The switch $SW_{13}$ is provided between the other end of the first capacitor $C_1$ and the output terminal of the first comparing portion $21_1$. The switches $SW_{12}$ and $SW_{13}$ serve as first connecting means for selectively setting any one of a state where the other end of the first capacitor $C_1$ is connected to the ground potential, a state where the other end of the first capacitor $C_1$ is connected to the output terminal of the first comparing portion $21_1$ and a state where the other end of the first capacitor $C_1$ is opened.

The switch $SW_{31}$ is provided between one end and the other end of the third capacitor $C_3$, and acts as third discharging means for discharging charges accumulated in the third capacitor $C_3$. The switch $SW_{32}$ is provided between the other end of the third capacitor $C_3$ and the ground potential. The switch $SW_{33}$ is provided between the other end of the third capacitor $C_3$ and the output terminal of the first comparing portion $21_1$. The switches $SW_{32}$ and $SW_{33}$ act as third connecting means for selectively setting any one of a state where the other end of the third capacitor $C_3$ is connected to the ground potential, a state where the other end of the third capacitor $C_3$ is connected to the output terminal of the first comparing portion $21_1$ and a state where the other end of the third capacitor $C_3$ is opened.

The first comparing portion $21_1$ inputs the voltage $V_1$ of one end of each of the first capacitor $C_1$ and the third capacitor $C_3$ through the inverting input terminal, inputs the reference voltage $V_{ref}$ input from the outside through the non-inverting input terminal to compare the voltage $V_1$ and the reference voltage $V_{ref}$, and then outputs a first comparison signal $S_1$ representing the compared result from the output terminal thereof. The first comparison signal $S_1$ is in high level when the voltage $V_1$ is smaller than the reference voltage $V_{ref}$, and in low level when the voltage $V_1$ is larger than the reference voltage $V_{ref}$.

One end of each of the second capacitor $C_2$ and the fourth capacitor $C_4$ is connected to the input terminal 20a via the current mirror circuit 24 and the switch $SW_2$, and also connected to the inverting input terminal of the second comparing portion $21_2$. Each of the second capacitor $C_2$ and the fourth capacitor $C_4$ can accumulate charges in accordance with the input of current.

The switch $SW_{21}$ is provided between one end and the other end of the second capacitor $C_2$, and acts as second discharging means for discharging charges accumulated in the second capacitor $C_2$. The switch $SW_{22}$ is provided between the other end of the second capacitor $C_2$ and the ground potential. The switch $SW_{23}$ is provided between the other end of the second capacitor $C_2$ and the output terminal of the second comparing portion $21_2$. The switches $SW_{22}$ and $SW_{23}$ act as second connecting means for selectively setting any one of a state where the other end of the second capacitor $C_2$ is connected to the ground potential, a state where the other end of the second capacitor $C_2$ is connected to the output terminal of the second comparing portion $21_2$ and a state where the other end of the second capacitor $C_2$ is opened.

The switch $SW_{41}$ is provided between one end and the other end of the fourth capacitor $C_4$, and acts as fourth discharging means for discharging charges accumulated in the fourth capacitor $C_4$. The switch $SW_{42}$ is provided between the other end of the fourth capacitor $C_4$ and the ground potential. The switch $SW_{43}$ is provided between the other end of the fourth capacitor $C_4$ and the output terminal of the second comparing portion $21_2$. The switches $SW_{42}$ and $SW_{43}$ acts as fourth connecting means for selectively setting any one of a state where the other end of the fourth capacitor $C_4$ is connected to the ground potential, a state where the other end of the fourth capacitor $C_4$ is connected to the output terminal of the second comparing portion $21_2$, and a state where the other end of the fourth capacitor $C_4$ is opened.

The second comparing portion $21_2$ inputs the voltage $V_2$ of one end of each of the second capacitor $C_2$ and the fourth capacitor $C_4$ through the inverting input terminal thereof, inputs the reference voltage $V_{ref}$ input from the outside through the non-inverting input terminal to compare the magnitude of the voltage $V_2$ with the reference voltage $V_{ref}$, and outputs a second comparison signal $S_2$ representing the compared result from the output terminal. The second comparison signal $S_2$ is in high level when the voltage $V_2$ is smaller than the reference voltage $V_{ref}$, and in low level when the voltage $V_2$ is larger than the reference voltage $V_{ref}$.

The first overvoltage preventing circuit $22_1$ is connected to the inverting input terminal of the first comparing portion $21_1$, and resets the potential of the inverting input terminal concerned. Likewise, the second overvoltage preventing circuit $22_2$ is connected to the inverting input terminal of the second comparing portion $21_2$ and resets the potential of the inverting input terminal. Each of the first comparing portion $21_1$ and the second comparing portion $21_2$ is not normally operated when the voltage of the inverting input terminal is stably kept higher than the voltage of the non-inverting input terminal. Such a situation may occur when power is turned on. Therefore, the first overvoltage preventing circuit $22_1$ and the second overvoltage preventing circuit $22_2$ reset the potentials of the inverting input terminals of the first comparing portion $21_1$ and the second comparing portion $21_2$ respectively, whereby they can operate normally.

The first one-shot circuit $23_1$ is provided between the output terminal of the first comparing portion $21_1$ and the S input terminal of the SR type flip-flop circuit 26 to stabilize the level variation of the first comparison signal $S_1$ output from the first comparing portion $21_1$. The second one-shot circuit $23_2$ is provided between the output terminal of the second comparing portion $21_2$ and the R input terminal of the SR type flip-flop circuit 26, and stabilizes the level variation of the second comparison signal $S_2$ output from the second comparing portion $21_2$. Each of the first one-shot circuit $23_1$ and the second one-shot circuit $23_2$ stabilizes the operation of the SR type flip-flop circuit 26.

The SR type flip-flop circuit 26 inputs through the S input terminal thereof the first comparison signal $S_1$ which is output from the first comparing portion $21_1$ and passed through the first one-shot circuit $23_1$, inputs through the R input terminal thereof the second comparison signal $S_2$ which is output from the second comparing portion $21_2$ and passes through the second one-shot circuit $23_2$, and outputs from the Q output terminal and the QB output terminal the output signals which vary in accordance with the level variations of the first comparison signal $S_1$ and the second comparison signal $S_2$, respectively. The buffer amplifier 28 amplifies the signal output from the Q output terminal of the SR type flip-flop circuit 26 and outputs it from the output terminal 20b to the outside. The output terminal 20b is connected to the gate portion 150.

The SR type flip-flop circuit 26 and the timing controller 27 act as timing control means for controlling the operation of each switch on the basis of the first comparison signal $S_1$ and the second comparison signal $S_2$. That is, the timing controller 27 generates and outputs a control signal for controlling the operation of each switch on the basis of the output signals from the Q output terminal and the QB output terminal of the SR type flip-flop circuit 26. Each switch is closed when the value of the control signal output and supplied from the timing controller 27 is in high level, and it is opened when the value of the control signal is in low level.

Figure 6:
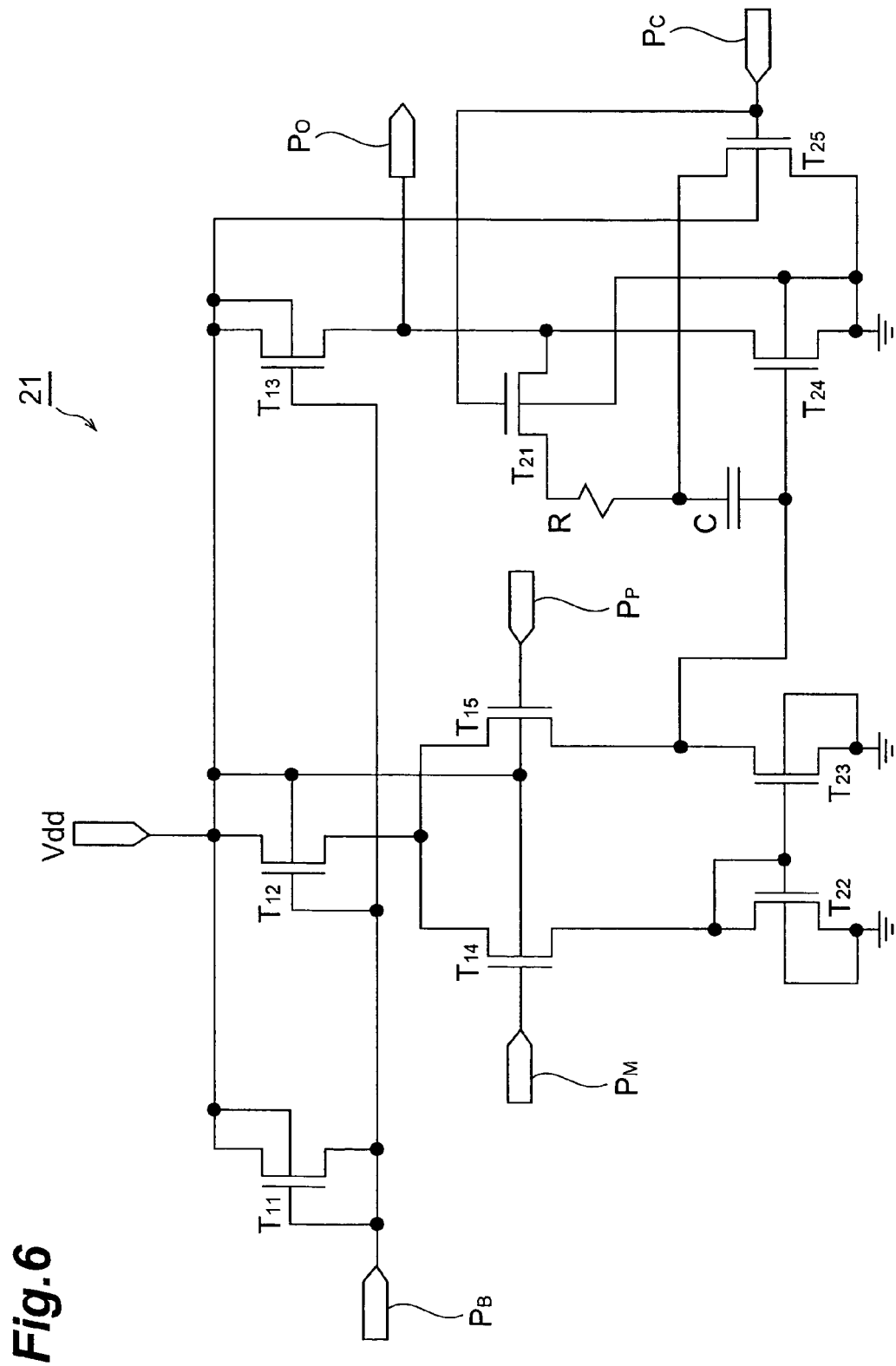
FIG. 6 is a diagram showing an example of a circuit of each of a first comparing portion $21_1$ and a second comparing portion $21_2$.

FIG. 6 is a diagram showing an example of the circuit of each of the first comparing portion $21_1$ and the second comparing portion $21_2$. The comparing portion 21 shown in FIG. 6 represents the first comparing portion $21_1$ and the second comparing portion $21_2$. The comparing portion 21 is equipped with p-channel CMOS transistors $T_{11}$ to $T_{15}$, n-channel CMOS transistors $T_{21}$ to $T_{25}$, a phase-compensated capacitor C and a resistance element R, and these elements are connected to one another as shown in the figure. The inverting input terminal $P_M$ is connected to the gate terminal of the transistor $T_{14}$, and inputs the voltage $V_1$ or $V_2$. The non-inverting input terminal $P_p$ is connected to the gate terminal of the transistor $T_{15}$, and inputs the reference voltage $V_{ref}$. The output terminal $P_o$ is connected to the respective drain terminals of the transistors $T_{13}$, $T_{21}$, and $T_{24}$, and outputs the first comparison signal $S_1$ or the second comparison signal $S_2$. The bias input terminal $P_B$ is connected to the gate terminals of the transistors $T_{11}$ to $T_{13}$, and used to set a bias voltage for operating the comparing portion 21. The control terminal $P_C$ is connected to the gate terminals of the transistors $T_{21}$ and $T_{25}$, and it serves to switch the operating mode (comparator mode/amplifier mode) of the comparing portion 21 by separating or connecting the phase-compensated capacitor C from or to the control terminal $P_C$. The power source terminal Vdd serves to input a power source voltage.

Figure 7:
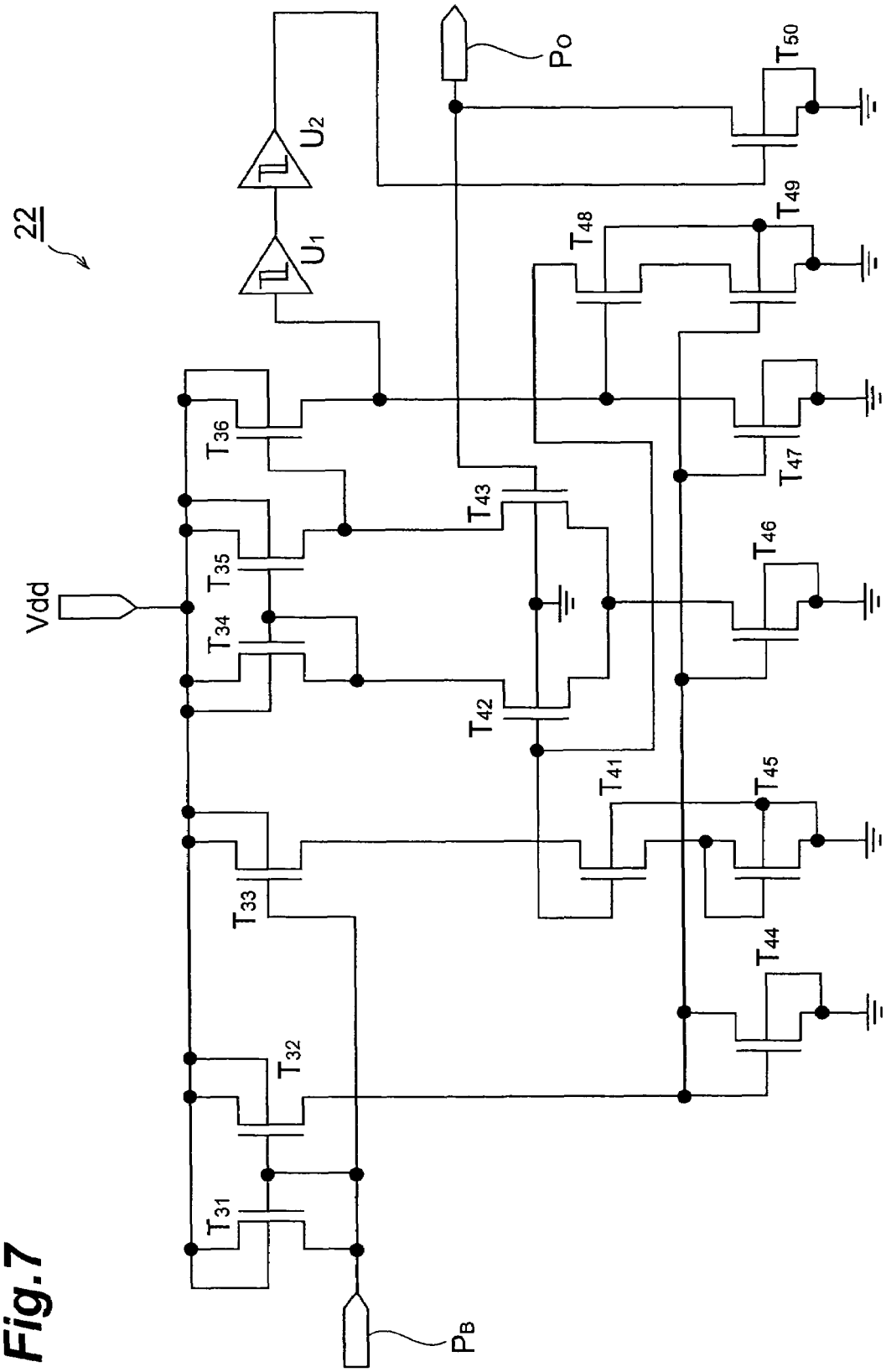
FIG. 7 is a diagram showing an example of a circuit of each of a first overvoltage preventing circuit $22_1$ and a second overvoltage preventing circuit $22_2$.

FIG. 7 is a diagram showing an example of each circuit of the first overvoltage preventing circuit $22_1$ and the second overvoltage preventing circuit $22_2$. The overvoltage preventing circuit 22 shown in FIG. 7 represents the first overvoltage preventing circuit $22_1$ and the second overvoltage preventing circuit $22_2$. The overvoltage preventing circuit 22 is equipped with p-channel CMOS transistors $T_{31}$ to $T_{36}$ n-channel CMOS transistors $T_{41}$ to $T_{50}$ and schmitt triggers $U_1$, $U_2$, and these elements are connected to one another as shown in FIG. 7. The bias input terminal $P_B$ is connected to the respective gate terminals of the transistors $T_{31}$ to $T_{33}$ and the drain terminal of the transistor $T_{31}$ and serves to set a bias voltage for operating the overvoltage preventing circuit 22. The terminal $P_o$ is connected to the gate terminal of the transistor $T_{43}$ and the drain terminal of the transistor $T_{50}$, and connected to the inverted input terminal of the first comparing portion $21_1$ or the second comparing portion $21_2$.

The bias input terminal $P_B$ is a terminal for giving bias of the circuit. The terminal $P_o$ is an output terminal which also serves as an input terminal. When the terminal $P_o$ reaches a set voltage or above a set voltage, the terminal $P_o$ is forcedly and instantaneously set to the ground potential by the transistor $T_{50}$. When the terminal $P_o$ becomes the ground potential (or below the ground voltage), the circuit of FIG. 7 is stabilized. The terminal $P_o$ which is kept stable is under a high impedance state, and gives no effect on the circuit connected to the terminal $P_o$. The power supply terminal Vdd serves to input a power source voltage.

Figure 8:
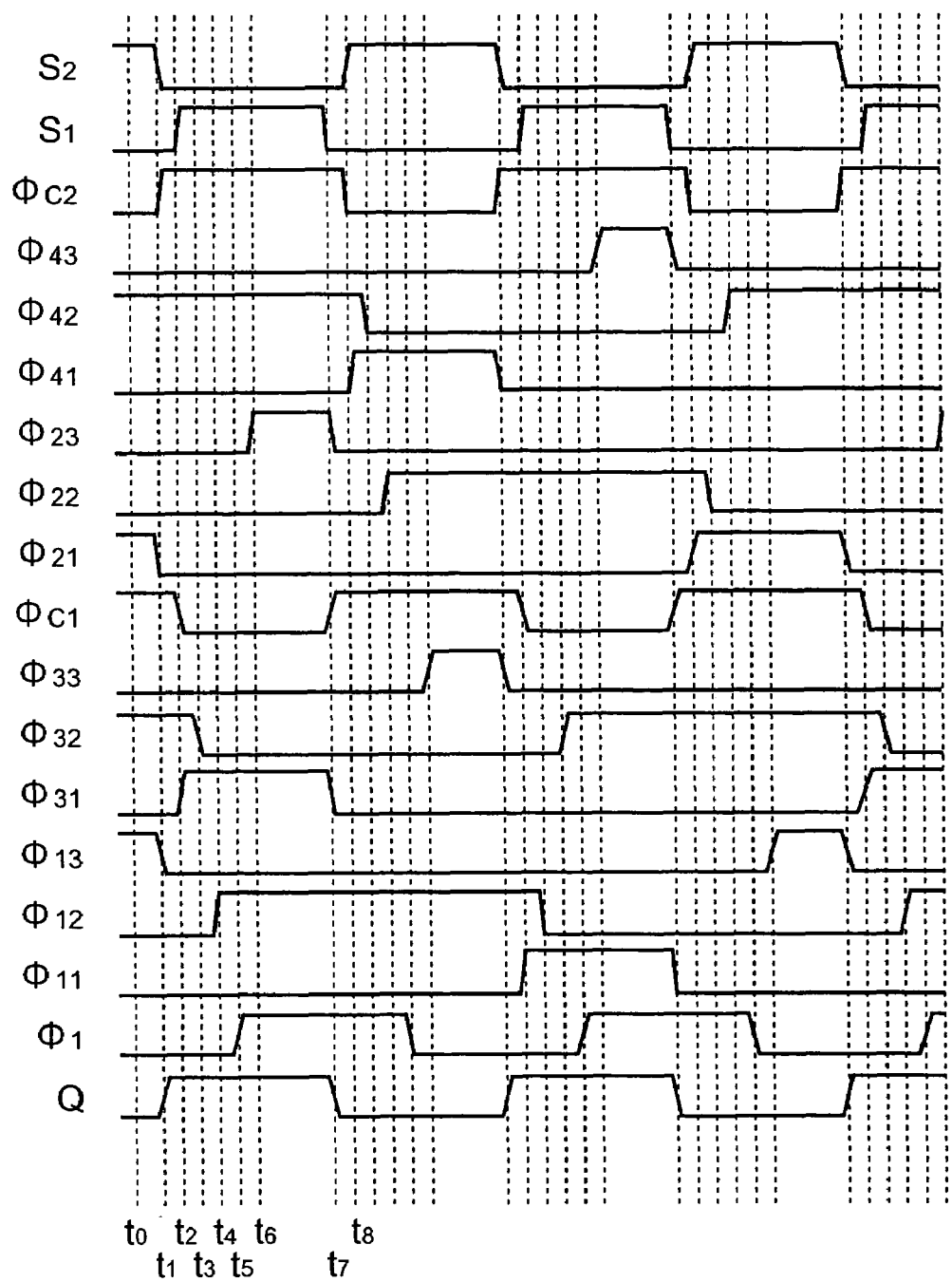
FIG. 8 is a timing chart showing the operation of the I/F converter 20 according to the second example.
Figure 9:
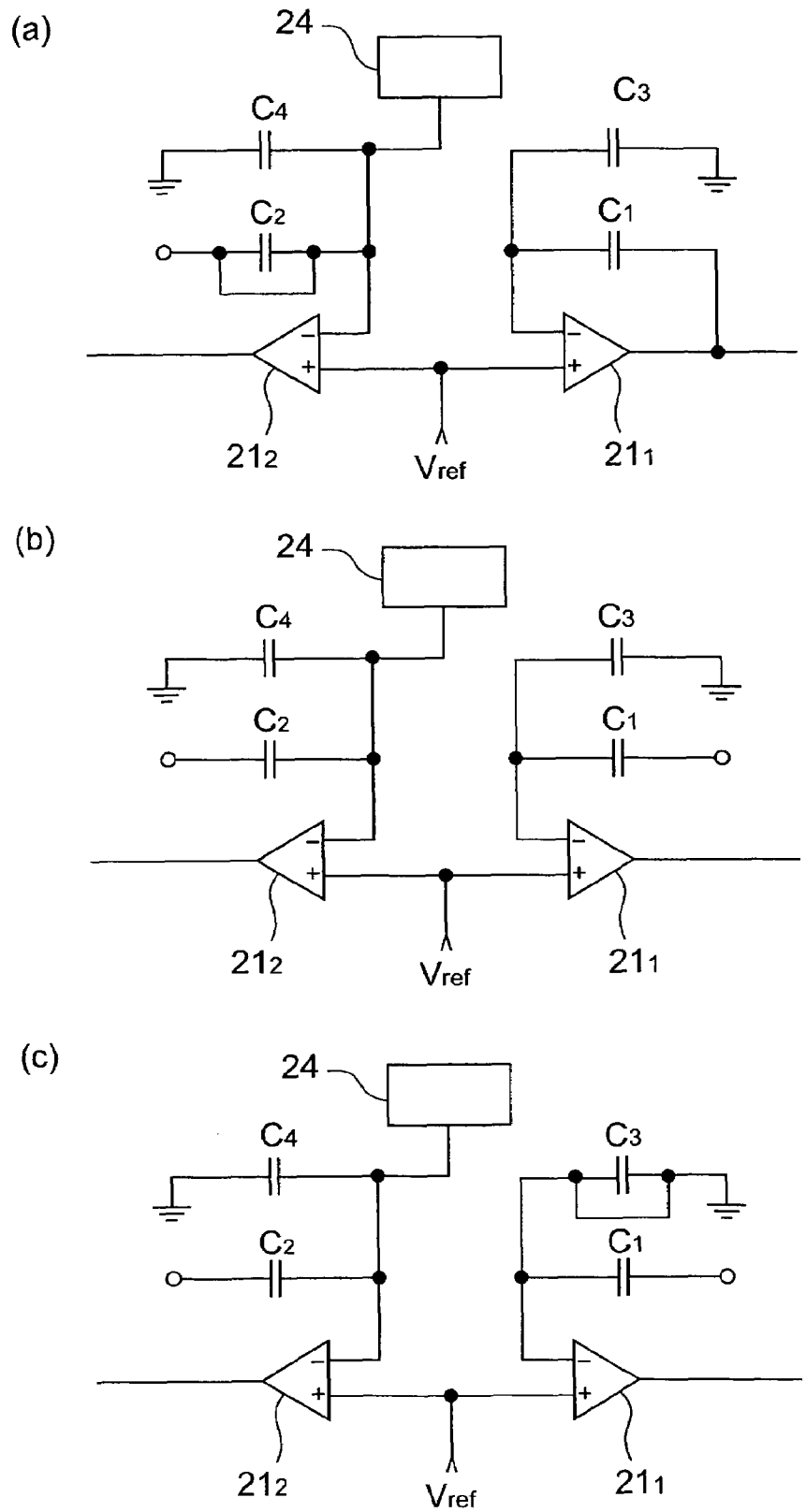
FIG. 9 is a diagram showing the open/close state of each switch and the connection state of each capacitor at each time in the operation of the I/F converter 20 of the second example.

Next, the operation of the I/F converter 20 according to the second example will be described. FIG. 8 is a timing chart showing the operation of the I/F converter 20 according to the second example. In FIG. 8, $\phi_1$ is a control signal for controlling the opening/closing operation of the switch $SW_1$, $\phi_{ij}$ represents a control signal for controlling the opening/closing operation of the switch $SW_{ij}$ (i=1 to 4, j=1 to 3), $\phi_{C1}$ represents a control signal that is input to the control terminal $P_C$ of the first comparing portion $21_1$ and switches the operating mode of the first comparing portion $21_1$, and $\phi_{C2}$ represents a control signal that is input to the control terminal $P_C$ of the second comparing portion $21_2$ and switches the operating mode of the second comparing portion $21_2$. The control signal $\phi_2$ for controlling the opening/closing operation of the switch $SW_2$ is a level-inverting signal of the control signal $\phi_1$ not shown in the figure. These control signals $\phi_1$, $\phi_2$, $\phi_{ij}$, $\phi_{C1}$, and $\phi_{C2}$ are output from the timing controller 27. FIG. 9 to FIG. 11 are diagrams showing the opening/closing state of each switch and the connection state of each capacitor at each time in the operation of the I/F converter 20 according to the second example.

Current output from any of the photodiodes 121 to 123 to which light is made incident is input to the input terminal 20a of the I/F converter 20, passed through the current mirror 24 and then input to the switches $SW_1$ and $SW_2$.

FIG. 9(a) shows the open/close state of each switch and the connection state of each capacitor at the time $t_0$. At the time $t_0$, the Q output of the SR type flip-flop circuit 26 is in low level, and the QB output is in high level. The control signal $\phi_1$ is in low level, the switch $SW_1$ is opened, the control signal $\phi_2$ is in high level, and the switch $SW_2$ is closed. As a result, current input to the input terminal 20a does not flow into the first comparing portion $21_1$ side, but flows into the second comparing portion $21_2$ side.

At the time $t_0$, the control signal $\phi_{11}$ is in low level, the switch $SW_{11}$ is opened, the control signal $\phi_{12}$ is in low level, the switch $SW_{12}$ is opened, the control signal $\phi_{13}$ is in high level, and the switch $SW_{13}$ is closed, so that the first capacitor $C_1$ is connected as a feedback capacitor between the inverting input terminal of the first comparing portion $21_1$ and the output terminal. The control signal $\phi_{31}$ is in low level, the switch $SW_{31}$ is opened, the control signal $\phi_{32}$ is in high level, the switch $SW_{32}$ is closed, the control signal $\phi_{33}$ is in low level, and the switch $SW_{33}$ is opened, so that the third capacitor $C_3$ is connected between the inverting input terminal of the first comparing portion $21_1$ and the ground potential, and charged with the reference voltage $V_{ref}$. The control signal $\phi_{C1}$ is in high level, and the first comparing portion $21_1$ is set to the amplifier mode. The first comparison signal $S_1$ output from the output terminal of the first comparing portion $21_1$ is in low level.

At the time $t_0$, the control signal $\phi_{21}$ is in high level, the switch $SW_{21}$ is closed, the control signal $\phi_{22}$ is in low level, the switch $SW_{22}$ is opened, the control signal $\phi_{23}$ is in low level, and the switch $SW_{23}$ is opened, as a result, the second capacitor $C_2$ is kept to a state where both ends thereof are short-circuited from each other and it is separated from the output terminal of the second comparing portion $21_2$. The control signal $\phi_{41}$ is in low level, the switch $SW_{41}$ is opened, the control signal 442 is in high level, the switch $SW_{42}$ is closed, the control signal $\phi_{43}$ is in low level, and the switch $SW_{43}$ is opened, so that the fourth capacitor $C_4$ is connected between the inverting input terminal of the second comparing portion $21_2$ and the ground potential, and accumulates charges in accordance with the flowing current. However, the voltage of the inverting input terminal of the second comparing portion $21_2$ is less than the reference voltage $V_{ref}$. The control signal $\phi_{C2}$ is in low level, and the second comparing portion $21_2$ is set to a comparator mode. The second comparison signal $S_2$ output from the output terminal of the second comparing portion $21_2$ is set to high level.

Subsequently to the time to, when the current input to the input terminal 20a is passed through the current mirror circuit 24 and flows into the second comparing portion $21_2$, the charge accumulated amount in the fourth capacitor $C_4$ gradually increases, and also the voltage of the inverting input terminal of the second comparing portion $21_2$ gradually increases. Finally, when the voltage of the inverting input terminal of the second comparing portion $21_2$ reaches the reference voltage $V_{ref}$ at the time $t_1$, the second comparison signal $S_2$ output from the output terminal of the second comparing portion $21_2$ is shifted to low level, the Q output of the SR type flip-flop circuit 26 is shifted to high level, and the QB output is shifted to low level.

The open/close state of each switch and the connection state of each capacitor at the time $t_1$ are shown in FIG. 9(b). At the time $t_1$, the control signal $\phi_{13}$ is shifted to low level, the switch $SW_{13}$ is opened, and subsequently the first capacitor $C_1$ holds charges which have been accumulated until that time. The control signal $\phi_{21}$ is shifted to low level, the switch $SW_{21}$ is opened, and subsequently the second capacitor $C_2$ is released from the state that both ends thereof are short-circuited from each other. The control signal $\phi_{C2}$ is shifted to high level, and the second comparing portion $21_2$ is shifted to the amplifier mode.

FIG. 9(c) shows the open/close state of each switch and the connection state of each capacitor after the time $t_2$ after a fixed time elapses from the time $t_1$. At the time $t_2$, the control signal $\phi_{31}$ is shifted to high level, the switch $SW_{31}$ is closed and subsequently the third capacitor $C_3$ is kept to a state where both ends thereof are short-circuited from each other and discharged. The control signal $\phi_{C1}$ is shifted to low level, and the first comparing portion $21_1$ is shifted to the comparator mode. The first comparison signal $S_1$ output from the output terminal of the first comparing portion $21_1$ is shifted to high level.

FIG. 10(a) shows the open/close state of each switch and the connection state of each capacitor after the time $t_3$ after a fixed time elapses from the time $t_2$. At the time $t_3$, the control signal $\phi_{32}$ is shifted to low level, the switch $SW_{32}$ is opened, and subsequently the third capacitor $C_3$ is separated from the output terminal of the first comparing portion $21_1$ while both ends thereof are short-circuited from each other.

FIG. 10(b) shows the open/close state of each switch and the connection state of each capacitor after the time $t_4$ after a fixed time elapses from the time $t_3$. At the time $t_4$, the control signal $\phi_{12}$ is shifted to high level, the switch $SW_{12}$ is closed and subsequently the first capacitor $C_1$ is connected between the inverting input terminal of the first comparing portion $21_1$ and the ground potential. Furthermore, the voltage of the inverting input terminal of the first comparing portion $21_1$ has the value corresponding to the amount of charges held in the first capacitor $C_1$ at the time $t_1$.

FIG. 10(c) shows the open/close state of each switch and the connection state of each capacitor after the time $t_5$ after a fixed time elapses from the time $t_4$. At the time $t_5$, the control signal $\phi_1$ is shifted to high level, the switch $SW_1$ is closed, the control signal $\phi_2$ is shifted to low level, the switch $SW_2$ is opened, and the charge accumulation into the fourth capacitor $C_4$ which has been continued until now is finished. Subsequently to the time $t_5$, the voltage of the inverting input terminal of the second comparing portion $21_2$ exceeds the reference voltage $V_{ref}$. Subsequently to the time $t_5$, the current input to the input terminal 20a passes through the current mirror circuit 24 and flows into the first comparing portion $21_1$ side, and the first capacitor $C_1$ accumulates the charges in accordance with the flowing current.

FIG. 11(a) shows the open/close state of each switch and the connection state of each capacitor after the time $t_6$ after a fixed time elapses from the time $t_5$. At the time $t_6$, the control signal $\phi_{23}$ is shifted to high level, the switch $SW_{23}$ is closed, and subsequently the second capacitor $C_2$ is connected between the inverting input terminal of the second comparing portion $21_2$ and the output terminal. Furthermore, subsequently to the time $t_6$, the voltage of the inverting input terminal of the second comparing portion $21_2$ becomes the reference voltage $V_{ref}$, and the charge (hereinafter referred to as "excess charge") exceeding the amount corresponding to the reference voltage $V_{ref}$ in the charges accumulated in the fourth capacitor $C_4$ before the time $t_6$ moves to the second capacitor $C_2$ as a feedback capacitor. The movement of the charge needs the time corresponding to the response speed of the second comparing portion $21_2$.

Subsequently to the time $t_6$, when the current input to the input terminal 20a passes through the current mirror circuit 24 and flows into the first comparing portion $21_1$ side, the charge accumulated amount in the first capacitor $C_1$ gradually increases, and the voltage of the inverting input terminal of the first comparing portion $21_1$ gradually increases. When the voltage of the inverting input terminal of the first comparison signal $S_1$ finally reaches the reference voltage $V_{ref}$ at the time $t_7$, the first comparison signal $S_1$ output from the output terminal of the first comparing portion $21_1$ is shifted to low level, the Q output of the SR type flip-flop circuit 26 is shifted to low level, and the QB output is shifted to high level.

FIG. 11(b) shows the open/close state of each switch and the connection state of each capacitor after the time $t_7$. At the time $t_7$, the control signal $\phi_{31}$ is shifted to low level, the switch $SW_{31}$ is opened, and subsequently the third capacitor $C_3$ is released from the state where both ends thereof are short-circuited from each other. The control signal $\phi_{23}$ is shifted to low level, the switch $SW_{23}$ is opened, and subsequently the second capacitor $C_2$ holds charges which have been accumulated until that time. The control signal $\phi_{C1}$ is shifted to high level, and the first comparing portion $21_1$ is shifted to the amplifier mode.

FIG. 11(c) shows the open/close state of each switch and the connection state of each capacitor after the time $t_8$ after a fixed time elapses from the time $t_7$. At the time $t_8$, the control signal $\phi_{41}$ is shifted to high level, the switch $SW_{41}$ is closed and subsequently the fourth capacitor $C_4$ is set so that both ends thereof are short-circuited from each other and discharged. The control signal $\phi_{C2}$ is shifted to low level, and the second comparing portion $21_2$ is shifted to the comparator mode. The second comparison signal $S_2$ output from the output terminal of the second comparing portion $21_2$ is shifted to high level.

Subsequently, the same operation is carried out. Charges are accumulated in the fourth capacitor $C_4$ from the time to the time $t_5$, and then charges are successively and repeatedly accumulated in the first capacitor $C_1$, the second capacitor $C_2$, the third capacitor $C_3$ and the fourth capacitor $C_4$ in this order. The above operation is repeated, the Q output signal of the SR type flip-flop circuit 26 becomes a pulse signal, and it is passed through the buffer amplifier 28 and output from the output terminal 20b. The number of pulses of the signal output from the output terminal 20b is counted by the counter 160, and the counted value (that is, the frequency) is output as a digital value. The frequency thus achieved is higher as the increasing speed of the amount of charges accumulated in each capacitor is higher, that is, the current input to the input terminal 20a is larger.

Furthermore, for example, when the charge accumulation is switched from the fourth capacitor $C_4$ to the first capacitor $C_1$, the excess charge out of the charges accumulated in the fourth capacitor $C_4$ moves to the second capacitor $C_2$, and after the charge accumulation is switched from the first capacitor $C_1$ to the second capacitor $C_2$, charges are newly accumulated in addition to the excess charge which has been already accumulated in the second capacitor $C_2$. As described above, when the capacitor for accumulating charges is switched, the excess charge is moved to and accumulated in another capacitor without being discarded. Accordingly, the photodetector 1 containing the I/F converter device 20 of this example can implement the high linearity of the input/output relationship in a broad dynamic range with high precision.

FIG. 12 is a diagram showing the comparison between the operation characteristics of the I/F converter 10 according to the first example and the operation characteristics of the I/F converter 20 according to the second example. FIG. 12(a) is a graph showing the relationship between the input current value and the output frequency, and FIG. 12(b) is a graph showing the relationship between the input current value and the linearity. With respect to the linearity, the variation amount of the output frequency in the range of the input current value from 1 nA to 10 nA is represented as "1." As shown in FIG. 12, in any case of the first example and the second example, high linearity for the input/out relationship is implemented with high precision in a broad dynamic range. As compared with the first example, high linearity is implemented in a broader dynamic range with high precision in the second example.

Second Embodiment

Figure 13:
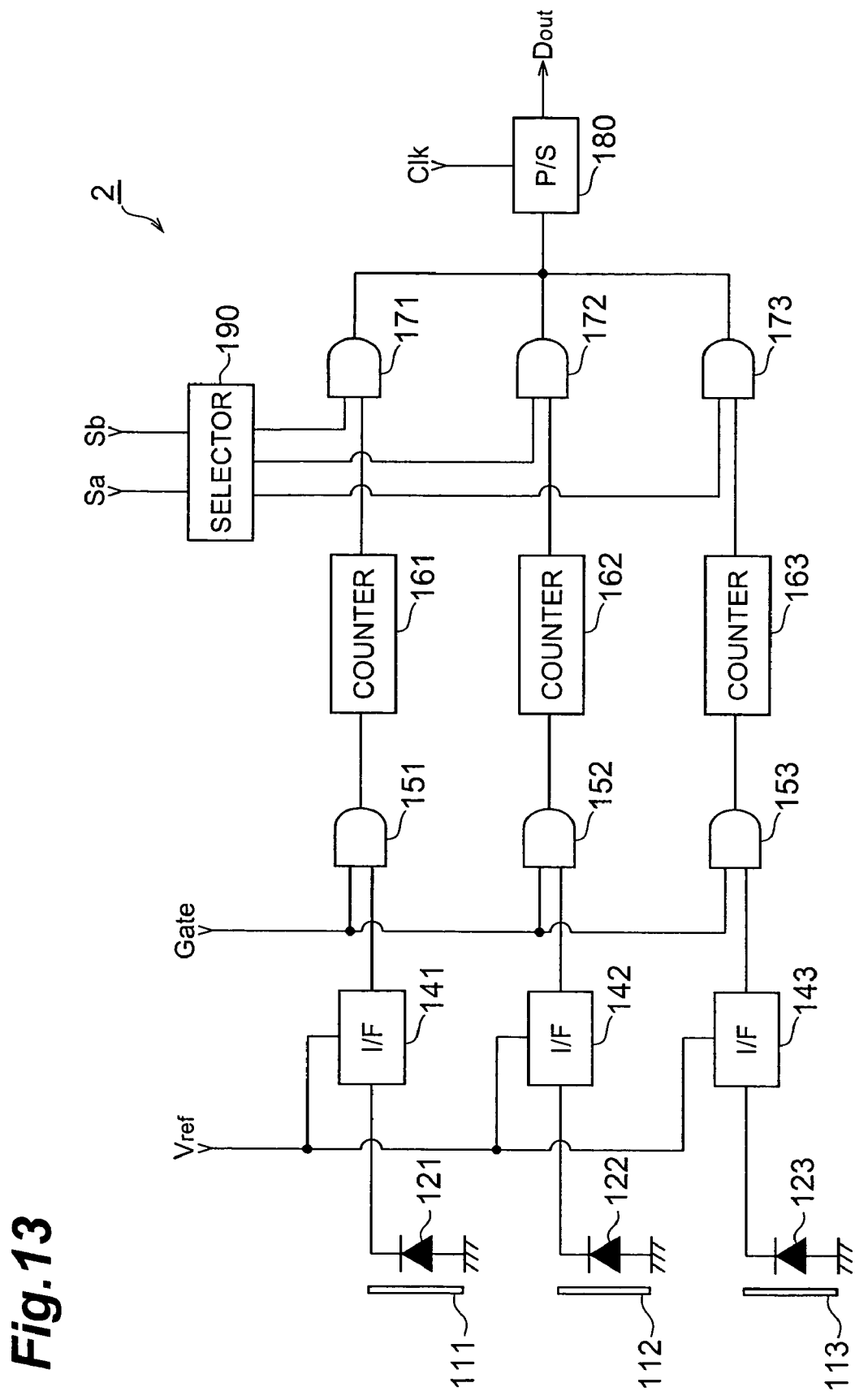
FIG. 13 is a diagram showing the construction of a photodetector 2 according to the second embodiment.

Next, a second embodiment of the photodetector according to the present invention. FIG. 13 is a diagram showing the construction of the photodetector 2 according to the second embodiment. The photodetector 2 shown in FIG. 13 is equipped with optical filters 111, 112, and 113, photodiodes 121, 122, and 123, I/F converters 141, 142, and 143, gate portions 151, 152, and 153, counters 161, 162, and 163, gate portions 171, 172, and 173, a P/S converter 180 and a selector 190.

As compared with the construction of the photodetector 1 according to the first embodiment shown in FIG. 1, the photodetector 2 of the second embodiment shown in FIG. 13 is different in that the gate portions 131 to 133 are not provided, three I/F converters 141 to 143 are provided, three gate portions 151 to 153 are provided, three counters 161 to 163 are provided, three gate portions 171 to 173 are provided, and the selector 190 controls the gate portions 171 to 173.

The input terminal of the I/F converter 141 is directly connected to the photodiode 121 without a gate portion, and it inputs the current output from the photodiode 121, and generates and outputs the pulse signal having the frequency corresponding to the magnitude of the input current. The input terminal of the I/F converter 142 is directly connected to the photodiode 122 without a gate portion, and it inputs the current output from the photodiode 122, and generates and outputs the pulse signal having the frequency corresponding to the magnitude of the input current. The input terminal of the I/F converter 143 is directly connected to the photodiode 123 without a gate portion, and it inputs the current output from the photodiode 123, and generates and outputs the pulse signal having the frequency corresponding to the magnitude of the input current. The ratio of the output frequency to the input current value in each of the I/F converters 141 to 143 is adjusted by the reference voltage $V_{ref}$. The I/F converter 10 of the first example shown in FIG. 2 to FIG. 4 is preferably used as each of the I/F converters 141 to 143. Furthermore, the I/F converter 20 of the second example shown in FIG. 5 to FIG. 12 is also preferably used.

The gate portion 151 inputs the pulse signal output from the I/F converter 141, outputs a logical signal of low level when the gate signal Gate is in low level and outputs the input pulse signal to the counter 161 when the gate signal Gate is in high level. The gate portion 152 inputs the pulse signal output from the I/F converter 142, outputs a logical signal of low level when the gate signal Gate is in low level and outputs the input pulse signal to the counter 162 when the gate signal Gate is in high level. Furthermore, the gate portion 153 inputs the pulse signal output from the I/F converter 143, outputs a logical signal of low level when the gate signal Gate is in low level and also outputs the input pulse signal to the counter 163 when the gate signal Gate is in high level.

The counter 161 counts the number of pulses in the pulse signal which is output from the I/F converter 141, passed through the gate portion 151 and then input, and outputs the counted value as a parallel signal. The counter 162 counts the number of pulses in the pulse signal which is output from the I/F converter 142, passed through the gate portion 152 and then input, and outputs the counted value as a parallel signal. The counter 163 counts the number of pulses in the pulse signal which is output from the I/F converter 143, passed through the gate portion 153 and then input, and outputs the counted value as a parallel signal.

Each of the gate portion 171 to 173 is operated on the basis of the control signal output from the selector 190. The gate 171 selects the input/cutoff of the parallel signal output from the counter 161 to the P/S converter 180. The gate 172 selects the input/cutoff of the parallel signal output from the counter 162 to the P/S converter 180. The gate 173 selects the input/cutoff of the parallel signal output from the counter 163 to the P/S converter 180.

The P/S converter 180 is connected to the counters 161 to 163 via the gate portions 171 to 173, and successively inputs the parallel signals output from the counters 161 to 163 by the operation of the gate portions 171 to 173. The P/S converter 180 converts the input parallel signal to a serial signal, and outputs the serial signal Dout in synchronizing with a clock signal Clk.

The selector 190 inputs logical signals Sa and Sb, and generates and outputs a control signal for controlling the operations of the gate portions 171 to 173. For example, when both the logical signals Sa and Sb are in low level, the selector 190 inputs the parallel signal output from the counter 161 to the P/S converter 180 via the gate portion 171. When the logical signal Sa is in high level and the logical signal Sb is in low level, the selector 190 inputs the parallel signal output from the counter 162 to the P/S converter 180 via the gate portion 172. Furthermore, when both the logical signals Sa and Sb are in high level, the selector 190 inputs the parallel signals output from the counter 163 via the gate portion 173 to the P/S converter 180.

In the photodetector 2 according to the second embodiment, red light out of input light is transmitted through the optical filter 111 and received by the photodiode 121, and the current corresponding to the intensity of the red light is output from the photodiode 121. Green light is transmitted through the optical filter 112 and received by the photodiode 122, and the current corresponding to the intensity of the green light is output from the photodiode 122. Furthermore, blue light is transmitted through the optical filter 113 and received by the photodiode 123, and the current corresponding to the intensity of the blue light is output from the photodiode 123.

The current output from the photodiode 121 is input to the input terminal of the I/F converter 141. In the I/F converter 141, the pulse signal having the frequency corresponding to the magnitude of the current input to the input terminal is generated, and the pulse signal concerned is output. The pulse signal output from the I/F converter 141 is input to the counter 161 by the operation of the gate portion 151 during the period when the gate signal Gate is in high level, and the number of the pulses is counted by the counter 161. The counted value of the pulses is output as a parallel signal from the counter 161.

The current output from the photodiode 122 is input to the input terminal of the I/F converter 142. In the I/F converter 142, the pulse signal having the frequency corresponding to the magnitude of the current input to the input terminal is generated, and this pulse signal is output. The pulse signal output from the I/F converter 142 is input to the counter 162 by the operation of the gate portion 152 during the period when the gate signal Gate is in high level, and the number of pulses is counted by the counter 162. The counted value of the pulses is output as a parallel signal from the counter 162.

The current output from the photodiode 123 is input to the input terminal of the I/F converter 143. In the I/F converter 143, the pulse signal having the frequency corresponding to the magnitude of the current input to the input terminal is generated, and this pulse signal is output. The pulse signal output from the I/F converter 143 is input to the counter 163 by the operation of the gate portion 153 during the period when the gate signal Gate is in high level, and the number of the pulses is counted by the counter 163. The counted value of the pulses is output as a parallel signal from the counter 163.

The operation of the portions from the photodiode 121 to the counter 161, the operation of the portions from the photodiode 122 to the counter 162 and the operation of the portions from the photodiode 123 to the counter 163 are carried out simultaneously.

The parallel signals output from the counters 161 to 163 are successively input to the P/S converter 180 and converted to a serial signal by the operation of the gate portions 171 to 173 controlled by the selector 190, and the serial signal Dout is output from the P/S converter 180. Accordingly, the digital value corresponding to the intensity of the red light received by the photodiode 121, the digital value corresponding to the intensity of the green light received by the photodiode 122 and the digital value corresponding to the intensity of the blue light received by the photodiode 123 are successively output as the serial signal from the P/S converter 180.

The photodetector 2 according to the second embodiment can implement high linearity with high precision with respect to the input/output relationship in a broad dynamic range as in the case of the photodetector 1 of the first embodiment. In addition, the photodetector 2 according to the second embodiment is equipped with three sets of the portions from the photodiode to the counter, and these sets of the portions can be operated simultaneously, so that the light intensities in the three different wavelength ranges of the input light can be detected at the same timing. That is, the counters 161 to 163 can count the number of pulses in the signals generated by the I/F converters 141 to 143 over the same period. Accordingly, the photodetector 2 is preferably used as a dimmer monitor for three colors of RGB of a liquid crystal backlight, for example.

INDUSTRIAL APPLICABILITY

The present invention is applicable to a photodetector having a plurality of photodetecting elements and an I/F converter.

The invention claimed is:

1. A photodetector comprising:
 a plurality of photodetecting elements; and
 an I/F converter connected to each of the plurality of photodetecting elements, wherein the I/F converter includes:
 an input terminal;
 switching means having:
  a first output terminal, and
  a second output terminal;
 said switching means selectively connecting the input terminal to one of the first output terminal and the second output terminal;
 a first capacitor connected to the first output terminal via one end of the first capacitor;
 first discharging means connected to said first capacitor, for discharging charges accumulated in the first capacitor;
 a first comparing portion having:
  a first input terminal,
  a second input terminal, and
  an output terminal,
 wherein said first input terminal of said first comparing portion is connected to the first output terminal of said switching means,
 wherein said second input terminal of said first comparing portion is connected to a first reference voltage,
 wherein said first comparing portion compares a magnitude of a voltage at the one end of the first capacitor with a reference voltage and outputs a first comparison signal representing the compared result from the output terminal thereof;
 a second capacitor connected to the second output terminal of the switching means via one end of the second capacitor;
 second discharging means connected to said second capacitor, for discharging charges accumulated in the second capacitor; and
 a second comparing portion having:
 a first input terminal;
 a second input terminal, and
 an output terminal;
 wherein said first input terminal of said second comparing portion is connected to the second output terminal of the switching means,
 wherein said second input terminal of said second comparing portion is connected to a second reference voltage,
 wherein said second comparing portion compares a magnitude of a voltage at the one end of the second capacitor with the second reference voltage, and outputs a second comparison signal representing the compared result from the output terminal thereof.

2. The photodetector according to claim 1,
 wherein the I/F converter further includes timing control means for controlling the operations of the switching means, the first discharging means and the second discharging means on the basis of the first comparison signal and the second comparison signal.

3. The photodetector according to claim 1,
 wherein only one I/F converter is provided to the plurality of photodetecting elements, and
 the I/F converter successively receives current output from each of the plurality of photodetecting elements for a predetermined period and successively generates a signal whose frequency corresponds to the magnitude of each current from the photodetecting elements.

4. The photodetector according to claim 3, further comprising a counter for counting a number of pulses in the signal generated by the I/F converter.

5. The photodetector according to claim 4,
 wherein the counter outputs a counted result as a parallel signal, and the photodetector further comprises a P/S converter for converting the parallel signal output from the counter to a serial signal.

6. The photodetector according to claim 1,
 wherein a plurality of I/F converters are provided in one-to-one correspondence to the plurality of photodetecting elements, and each of the plurality of I/F converters connected to the corresponding photodetecting element.

7. The photodetector according to claim 6,
 wherein a plurality of counters are provided in one-to-one correspondence to the plurality of I/F converters, and each counter counts a number of pulses of a signal generated by the corresponding I/F converter.

8. The photodetector according to claim 7,
 wherein each of the plurality of counters outputs a counted result as a parallel signal, and
 the photodetector further comprises only one P/S converter that is provided to the plurality of counters, successively inputs the parallel signal output from each of the plurality of counters and converts the parallel signal to a serial.

9. The photodetector according to claim 7,
 wherein the plurality of counters count numbers of pulses of the signals generated by the corresponding I/F converters over the same period.

10. The photodetector according to claim 1,
 wherein the I/F converter includes:
 a third capacitor connected to the first output terminal of the switching means via one end of the third capacitor;
 third discharging means connected to said third capacitor, for discharging the charges accumulated in the third capacitor;
 a fourth capacitor connected to the second output terminal of the switching means via one end of the fourth capacitor;
 fourth discharge means for discharging charges accumulated in the fourth capacitor;
 first connecting means for selectively setting any one of
  a state where the other end of the first capacitor is connected to a ground potential,
  a state where the other end of the first capacitor is connected to the output
  terminal of the first comparing portion, and a state where the other end of the first capacitor is opened; second connecting means for selectively setting any one of
a state where the other end of the second capacitor is connected to the ground potential,
a state where the other end of the second capacitor is connected to the output terminal of the second comparing portion,
and a state where the other end of the second capacitor is opened; third connecting means for selectively setting any one of
a state where the other end of the third capacitor is connected to the ground potential,
a state where the other end of the third capacitor is connected to the output terminal of the first comparing portion, and
a state where the other end of the third capacitor is opened; and fourth connecting means for selectively setting any one of
a state where the other end of the fourth capacitor is connected to the ground potential,
a state where the other end of the fourth capacitor is connected to the output terminal of the second comparing portion, and
a state where the other end of the fourth capacitor is opened, wherein each of the first comparing portion and the second comparing portion can be selectively set to any one of a comparator mode and amplifier mode.

11. The photodetector according to claim 10, wherein the I/F converter further includes timing control means for controlling
the operations of the switching means,
the first discharging means,
the second discharging means,
the third discharging means,
the fourth discharging means,
the first connecting means,
the second connecting means,
the third connecting means,
the fourth connecting means,
the first comparing portion, and the second comparing portion on the basis of the first comparison signal and the second comparison signal.

12. A photodetector according to claim 1, wherein said first and second reference voltages are the same.

* * * * *